United States Patent
Williams

(10) Patent No.: US 10,494,037 B2
(45) Date of Patent: Dec. 3, 2019

(54) TRUCK BED HEIGHT EXTENSION ASSEMBLIES AND PICKUP TRUCKS HAVING THE SAME

(71) Applicant: Toyota Motor Engineering & Manufacturing North America, Inc., Erlanger, KY (US)

(72) Inventor: Clinton J. Williams, Saline, MI (US)

(73) Assignee: Toyota Motor Engineerig & Manufacturing North America, Inc., Plano, TX (US)

(*) Notice: Subject to any disclaimer, the term of this patent is extended or adjusted under 35 U.S.C. 154(b) by 69 days.

(21) Appl. No.: 15/865,932

(22) Filed: Jan. 9, 2018

(65) Prior Publication Data
US 2019/0210664 A1    Jul. 11, 2019

(51) Int. Cl.
*B60P 3/34* (2006.01)
*B62D 33/027* (2006.01)
*B60P 7/14* (2006.01)
*B60P 7/08* (2006.01)
*B62D 33/08* (2006.01)

(52) U.S. Cl.
CPC ............ *B62D 33/0276* (2013.01); *B60P 7/08* (2013.01); *B60P 7/14* (2013.01); *B62D 33/08* (2013.01)

(58) Field of Classification Search
CPC ........ B62D 33/0273; B60J 7/141; B60P 3/40; B60P 3/122; B60P 3/125; B60R 13/01; B60R 9/00; A01D 87/127
See application file for complete search history.

(56) References Cited

U.S. PATENT DOCUMENTS

| | | | |
|---|---|---|---|
| 3,841,690 A | 10/1974 | Piercy | |
| 4,313,708 A * | 2/1982 | Tiliakos | B65D 90/14 254/47 |
| 5,366,266 A * | 11/1994 | Harbison | B60J 7/1614 16/364 |
| 5,725,137 A * | 3/1998 | Macdonald | B60R 9/00 211/206 |
| 5,732,995 A * | 3/1998 | Piccariello | B60P 1/435 296/57.1 |

(Continued)

OTHER PUBLICATIONS

Title: Agroliner URL: <http://www.kroeger-nutzfahrzeuge.de/74-1-MUK-303.html> Published/Access Date: Aug. 24, 2017.

(Continued)

*Primary Examiner* — Kiran B Patel
(74) *Attorney, Agent, or Firm* — Dinsmore & Shohl LLP

(57) ABSTRACT

A truck bed height extension assembly for a pickup truck includes a truck bed and a pair of side panels. The truck bed includes a floor and a pair of spaced apart sidewalls. Each of the pair of spaced apart sidewalls includes an exterior wall, an opposite interior wall, and an elongated cavity positioned between the exterior wall and the interior wall of each of the pair of sidewalls. The pair of side panels are linearly displaceable in a vehicle vertical direction between a retracted position and an extended position. In the retracted position, each of the pair of side panels are positioned within the elongated cavity defined in each of the pair of sidewalls. In the extended position, each of the pair of side panels are positioned to extended at least partially outside of the elongated cavity of each of the pair of sidewalls.

20 Claims, 15 Drawing Sheets

(56) References Cited

U.S. PATENT DOCUMENTS

| | | | |
|---|---|---|---|
| 5,816,638 A | 10/1998 | Pool, III | |
| 6,106,050 A * | 8/2000 | McLeod | B62D 33/0273 296/100.06 |
| 6,152,510 A * | 11/2000 | Newsome | B62D 33/023 296/10 |
| 6,592,162 B2 * | 7/2003 | Felix | B62D 33/0276 296/3 |
| 6,644,708 B1 * | 11/2003 | Grzegorzewski | B60P 1/43 296/10 |
| 6,676,182 B2 | 1/2004 | Fitts | |
| 6,991,277 B1 * | 1/2006 | Esler | B60P 1/435 296/26.08 |
| 6,994,363 B2 * | 2/2006 | Seksaria | B60P 3/40 280/166 |
| 7,007,995 B1 | 3/2006 | Scarberry et al. | |
| 7,226,108 B2 * | 6/2007 | Altman | B60J 7/1614 296/100.02 |
| 7,246,839 B1 * | 7/2007 | Nyberg | B60J 7/11 296/100.01 |
| 7,384,089 B1 * | 6/2008 | Ablang | B60J 7/141 296/100.08 |
| 7,654,603 B2 * | 2/2010 | Kealy | B60J 7/1614 296/100.02 |
| 7,712,811 B2 * | 5/2010 | Heaman | B62D 33/0273 296/26.08 |
| 7,878,568 B2 | 2/2011 | Wu | |
| 8,740,277 B1 * | 6/2014 | Al-Qahtani | B62D 33/0207 296/3 |
| 8,794,690 B1 * | 8/2014 | Al-Saeed | B60J 7/1621 296/100.06 |
| 8,857,880 B2 | 10/2014 | Kalergis et al. | |
| 9,010,837 B2 | 4/2015 | Mulholland et al. | |
| 9,156,412 B1 * | 10/2015 | Calvert | B60P 7/08 |
| 9,403,424 B2 * | 8/2016 | Cortez | B60J 7/141 |
| 9,409,608 B2 | 8/2016 | Waskie et al. | |
| 9,481,404 B1 * | 11/2016 | Rich | B60P 7/04 |
| 9,713,950 B1 * | 7/2017 | Stoddard, Jr. | B60J 7/1621 |
| 9,731,775 B1 | 8/2017 | Tsumiyama et al. | |
| 9,937,962 B1 * | 4/2018 | Tyler | B62D 33/033 |
| 10,046,628 B1 * | 8/2018 | Fulton | B60J 7/067 |
| 10,166,906 B1 * | 1/2019 | Lau | B62D 33/0276 |
| 2002/0125728 A1 * | 9/2002 | Chambers | B62D 33/08 296/3 |
| 2003/0127875 A1 * | 7/2003 | Hornick | B60P 7/08 296/32 |
| 2004/0026948 A1 * | 2/2004 | Novajovsky | B60J 7/04 296/26.08 |
| 2004/0036308 A1 * | 2/2004 | Sloss | B60P 1/02 296/3 |
| 2007/0108801 A1 | 5/2007 | Huotari et al. | |
| 2007/0278810 A1 * | 12/2007 | Collins | B60P 3/40 296/3 |
| 2017/0158254 A1 | 6/2017 | Singer | |

OTHER PUBLICATIONS

Title: Pronar trailer T683 URL: <http://pronar.pl/en/produkt/pronar-trailer-t683/> Published/Access Date: Aug. 24, 2017.

\* cited by examiner

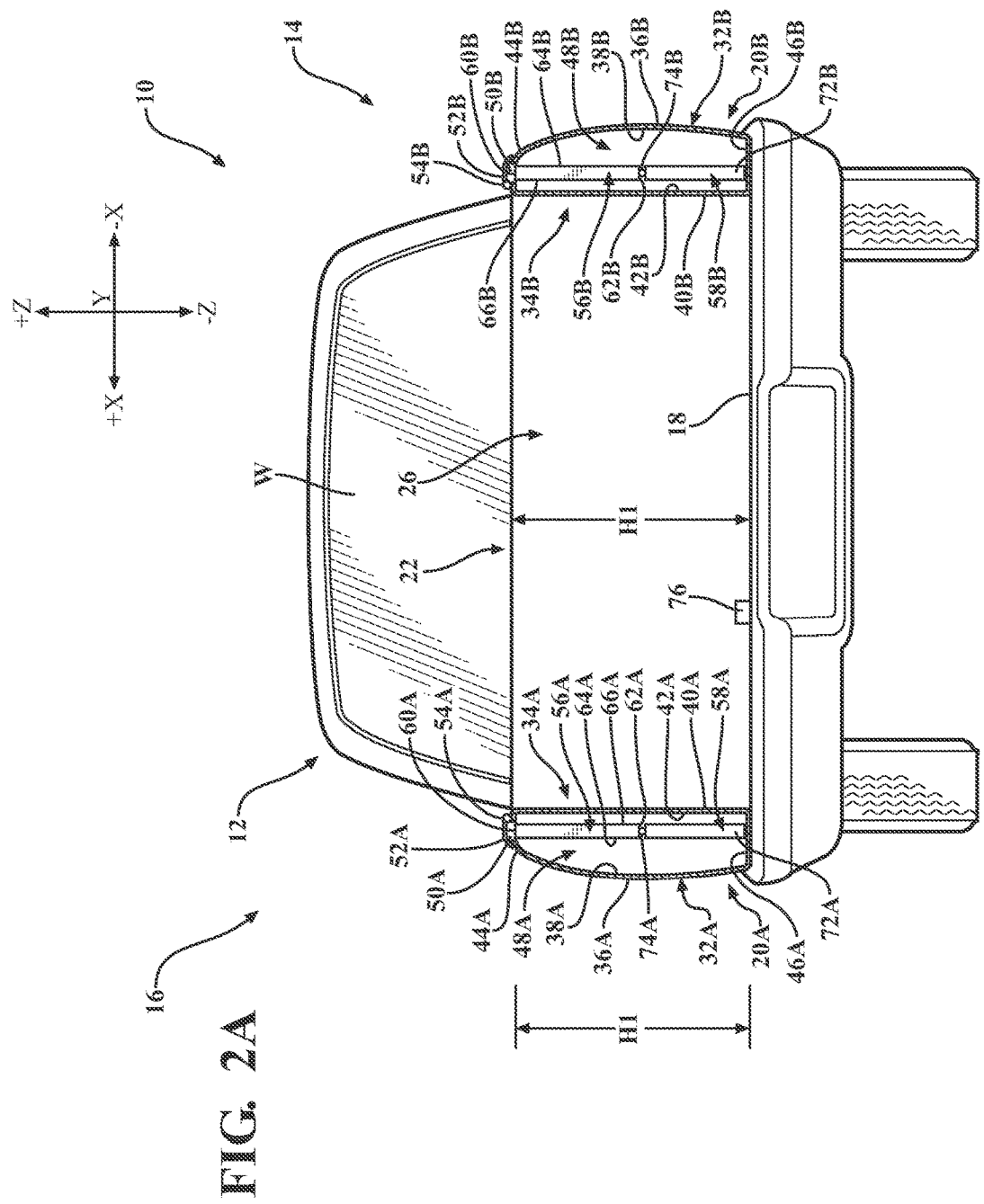

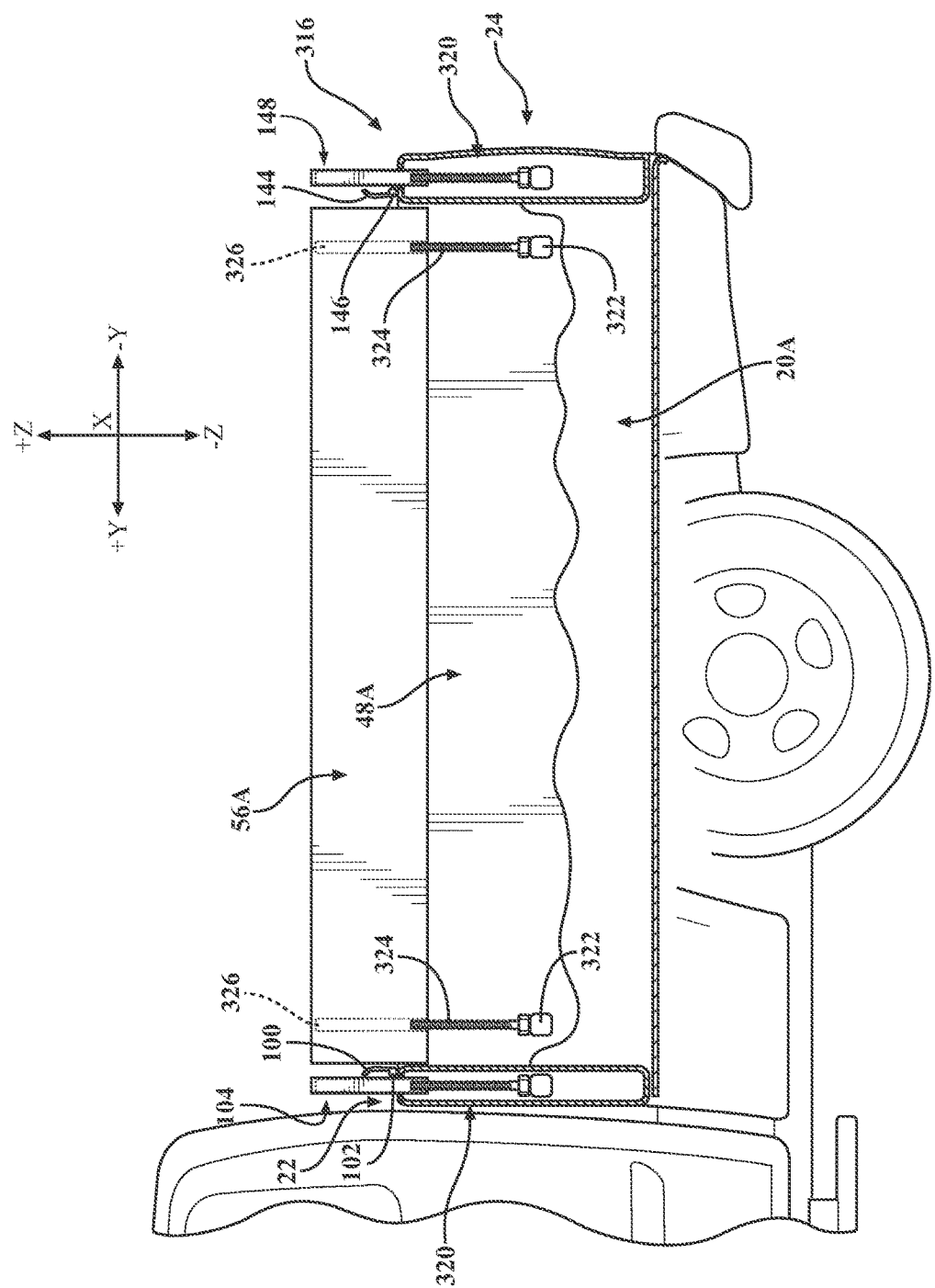

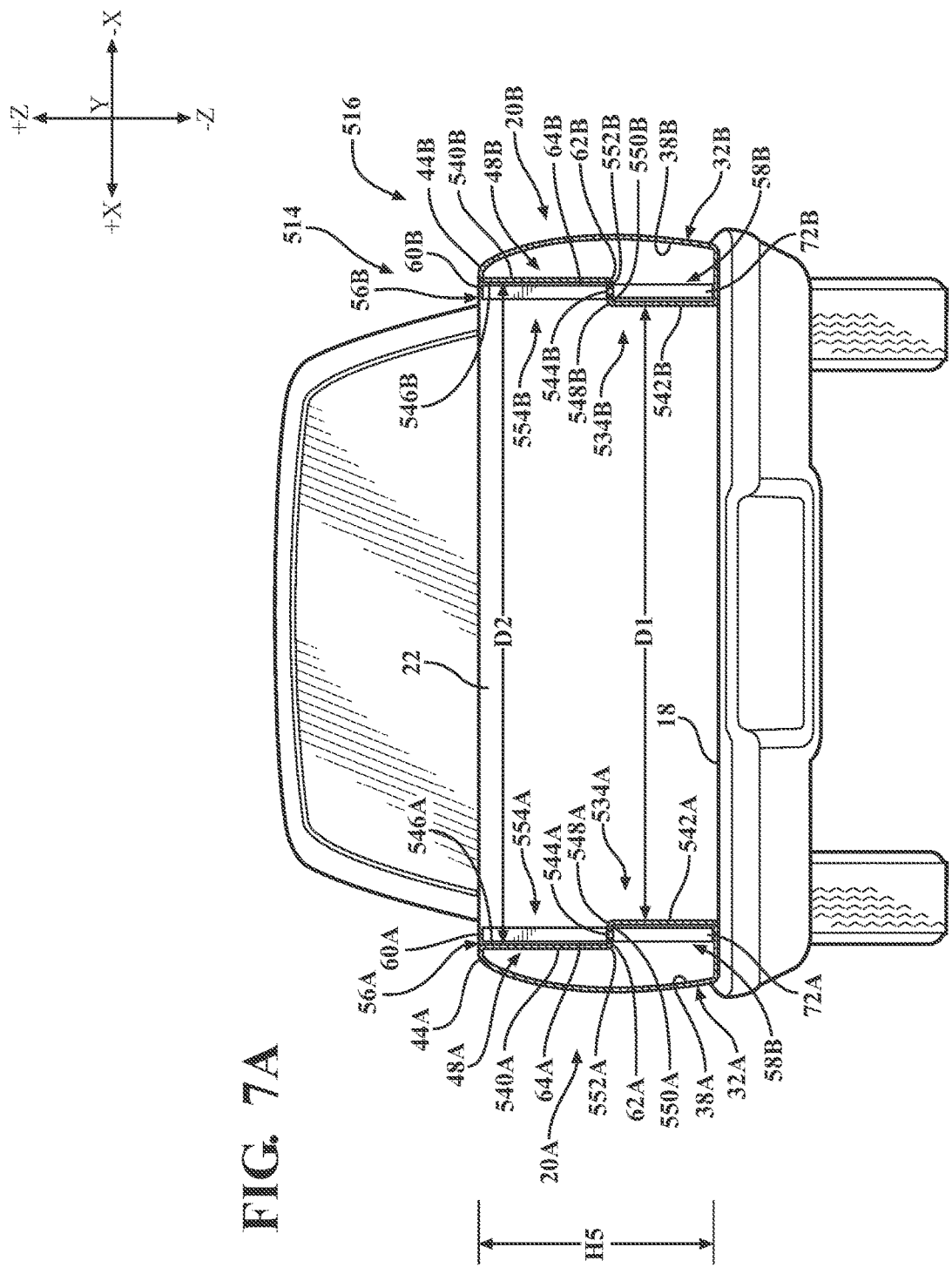

US 10,494,037 B2

TRUCK BED HEIGHT EXTENSION ASSEMBLIES AND PICKUP TRUCKS HAVING THE SAME

TECHNICAL FIELD

The present specification generally relates to pickup truck beds and, more specifically, to truck bed height extension assemblies for pickup trucks.

BACKGROUND

Truck bed height extensions, or hungry boards, are currently known and used to extend a height of sidewalls of a truck bed to increase a storage capacity. Existing truck bed height extensions are secured to the truck bed sidewalls when in use and removed for remote storage when not in use. The remote storage of the hungry boards is inconvenient as the hungry boards are not readily available at all times for use to increase the storage capacity of the truck bed.

Accordingly, there is a need for truck bed height extensions that are integrated with the truck bed eliminating the need for remote storage, and which are readily available for increasing the storage capacity of the truck bed.

SUMMARY

In accordance with one embodiment, a truck bed height extension assembly for a pickup truck is provided. The truck bed height extension assembly includes a truck bed and a pair of side panels. The truck bed includes a floor and a pair of spaced apart sidewalls. Each of the pair of spaced apart sidewalls includes an exterior wall, an opposite interior wall, and an elongated cavity. The elongated cavity is defined between the exterior wall and the interior wall of each of the pair of sidewalls. The pair of side panels is linearly displaceable in a vehicle vertical direction between a retracted position and an extended position. In the retracted position, each of the pair of side panels is positioned within the elongated cavity defined in each of the pair of sidewalls. In the extended position, each of the pair of side panels is positioned at least partially outside the elongated cavity of each of the pair of sidewalls.

In accordance with another embodiment, a pickup truck is provided including a passenger cabin, a truck bed, and a pair of side panels. The truck bed is positioned rearward of the passenger cabin in the vehicle longitudinal direction. The truck bed includes a floor and a pair of spaced apart sidewalls. Each of the pair of spaced apart sidewalls includes an exterior wall, an opposite interior wall, and an elongated cavity defined between the exterior wall and the interior wall of each of the pair of sidewalls. The pair of side panels is linearly displaceable in a vehicle vertical direction between a retracted position and an extended position. In the retracted position, each of the pair of side panels is positioned within the elongated cavity defined in each of the pair of sidewalls. In the extended position, each of the pair of side panels is positioned at least partially outside of the elongated cavity of each of the pair of sidewalls.

In accordance with another embodiment, a truck bed height extension assembly for a pickup truck is provided. The truck bed height extension assembly includes a truck bed and a pair of side panels. The truck bed includes a floor and a pair of spaced part sidewalls. Each of the pair of sidewalls includes an exterior wall and an opposite interior wall. The interior wall of each of the pair of sidewalls includes an inner surface and a recessed portion. The recessed portion includes a shoulder portion and a recessed surface. Each of the pair of side panels includes a distal end and an opposite proximate end. The pair of side panels is linearly displaceable in a vehicle vertical direction between a retracted position and an extended position. In the retracted position, the proximate end of each of the pair of side panels abuts the shoulder portion of the recessed portion. In the extended position, the proximate end of each of the pair of side panels is spaced apart from the shoulder portion of the recessed portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 2A schematically depicts a partial cross section of a rear view of the pickup truck of FIG. 1 with the pair of side panels in a retracted position, according to one or more embodiments described and illustrated herein;

FIG. 5B schematically depicts a partial cross section of a side view of the truck bed of the pickup truck of FIG. 5A with the pair of side panels, the rear panel, and the front panel in the retracted position, according to one or more embodiments described and illustrated herein;

FIG. 7A schematically depicts a partial cross section of a rear view of a pickup truck having a truck bed with a truck bed height extension assembly having a pair of side panels in a retracted positon, according to one or more embodiments described and illustrated herein;

DETAILED DESCRIPTION

Figure 1:
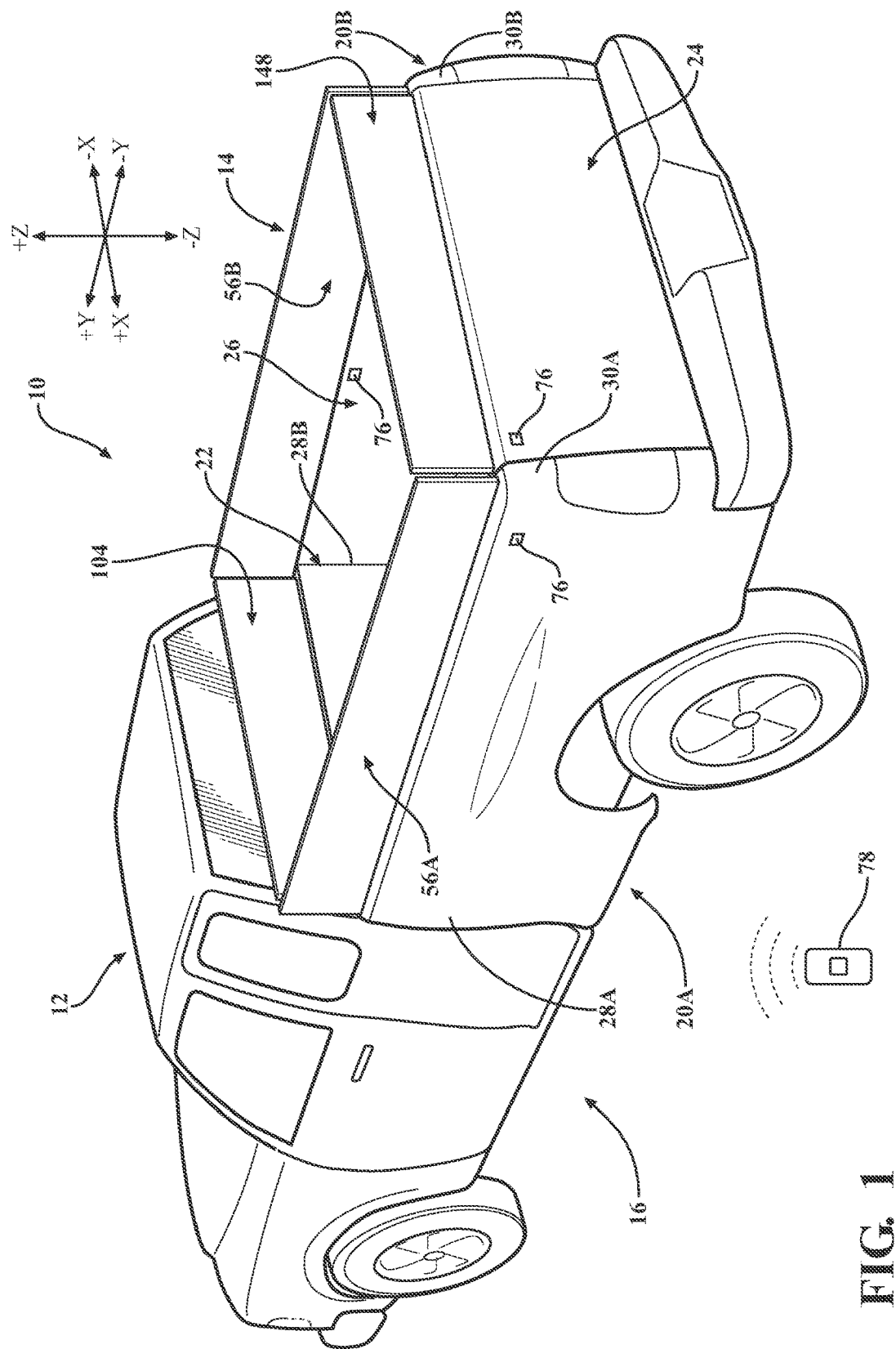
FIG. 1 schematically depicts a perspective view of a pickup truck having a truck bed with a truck bed height extension assembly having a pair of side panels, a rear panel, and a front panel in an extended positon, according to one or more embodiments described and illustrated herein.

Pickup trucks according to the present specification include a passenger cabin and a truck bed located rearward of the passenger cabin. The truck bed is included in a truck bed height extension assembly utilized to extend a height of the truck bed in order to increase the storage capacity of the truck bed. The truck bed includes a floor and a pair of sidewalls. Each of the pair of sidewalls has an exterior wall and an opposite interior wall. The sidewalls each have an upper end that extends between the exterior wall and the interior wall. The exterior wall of each of the sidewalls of the truck bed includes an inner surface and an opposite outer surface, and the interior wall of each of the sidewalls of the truck bed includes an inner surface and an opposite outer surface. An elongated cavity is defined between the inner surface of the interior wall and the inner surface of the exterior wall of each of the sidewalls.

The truck bed height extension assembly also includes a pair of side panels that are moveable between a stored or retracted position and an extended position. The side panels are received within the elongated cavities when in the retracted position. The side panels extend at least partially outside the elongated cavities, beyond the upper ends when in the extended position. As the side panels are stored within the sidewalls of the truck bed when in the retracted position, the side panels are no longer required to be stored remotely and are readily available to increase a storage capacity of the truck bed upon movement into the extended position.

In some embodiments, the truck bed height extension assembly may include an actuator provided for each of the pair of side panels. The actuators are actuated to move the pair of side panels between the retracted position and the extended position. The actuators may be actuated by a switch located on the pickup truck or by a remote device such as a key fob, smartphone or another mobile computer device.

In some other embodiments, the truck bed of the truck bed height extension assembly may also include a front wall and a rear wall. The front wall extends between front ends of the pair of sidewalls in the vehicle lateral direction and the rear wall extends between rear ends of the pair of sidewalls in a vehicle lateral direction. The front wall includes an exterior wall and an opposite interior wall, and an elongated cavity defined between the exterior wall and the interior wall of the front wall. The rear wall includes an exterior wall and an opposite interior wall, and an elongated cavity is defined between the exterior wall and the interior wall of the rear wall. A front panel and a rear panel are positioned within the elongated cavity of the front wall and the elongated cavity of the rear wall, respectively. The front panel and the rear panel are moveable between a retracted position and an extended position. The front panel and the rear panel are received within the elongated cavities of the front wall and the rear wall, respectively, when in the retracted position. The front panel and the rear panel extend at least partially outside the elongated cavities, beyond upper ends of the front wall and the rear wall, respectively, when in the extended position.

In some other embodiments, a truck bed cover, such as a tonneau cover, is releasably connected to the front panel, the rear panel, and the pair of side panels. The tonneau cover is moveable between a lowered position and a raised position upon movement of the front panel, the rear panel, and the pair of side panels between the retracted position and the extended position. The movement of the tonneau cover to the raised position increases a covered storage capacity of the truck bed. Further, the connection of the tonneau cover to the front panel, the rear panel, and the pair of side panels allows for the increase of the storage capacity of the truck bed without the requirement of removing the tonneau cover.

Various embodiments of pickup truck height extension assembly and pickup trucks having such height extensions will be described in more detail herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in direction with respect to a pickup truck centerline. The term "inboard" or "inward" as used herein refers to the relative location of a component in direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline 13 when evaluating components positioned along opposite sides of the pickup truck 10.

Figure 2B:
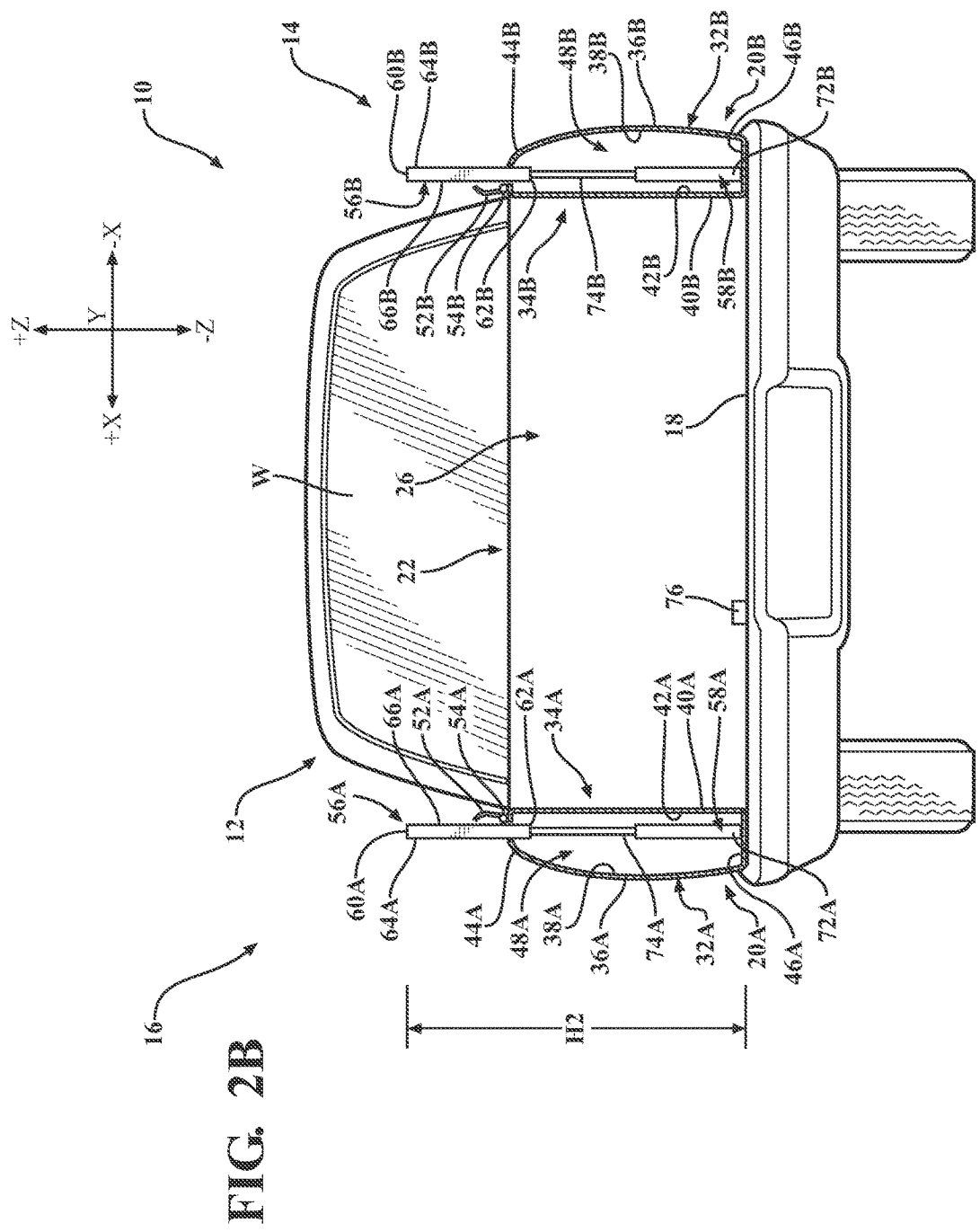
FIG. 2B schematically depicts a partial cross section of a rear view of the pickup truck of FIG. 1 with the pair of side panels in the extended position, according to one or more embodiments described and illustrated herein.

Referring initially to FIGS. 1, 2A, and 2B, a pickup truck is generally illustrated at 10. The pickup truck 10 includes a passenger cabin 12, a truck bed 14, and a truck bed height extension assembly 16. The truck bed 14 includes a floor 18, a pair of spaced apart sidewalls 20A, 20B, a front wall 22, and a rear wall 24. The floor 18, the sidewalls 20A, 20B, the front wall 22, and the rear wall 24 define a storage area 26 of the truck bed 14.

The sidewalls 20A, 20B extend parallel to the vehicle longitudinal direction. Each sidewall 20A, 20B includes a front end 28A, 28B and an opposite rear end 30A, 30B. The front wall 22 extends between the front ends 28A, 28B of the sidewalls 20A, 20B. The rear wall 24 extends between the rear ends 30A, 30B of the sidewalls 20A, 20B.

In some embodiments, it is appreciated, that the rear wall 24 is pivotally connected to the sidewalls 20A, 20B as a tailgate for movement between a closed position and an open position (not shown). In the closed position, the rear wall 24 extends parallel to the vehicle vertical direction. In the open position, the rear wall 24 extends parallel to the vehicle longitudinal direction.

Referring to FIGS. 2A and 2B, the sidewalls 20A, 20B include an exterior wall 32A, 32B and an opposite interior wall 34A, 34B. The exterior walls 32A, 32B include an outer surface 36A, 36B and an opposite inner surface 38A, 38B. The interior walls 34A, 34B include an outer surface 40A, 40B and an opposite inner surface 42A, 42B. The inner surfaces 38A, 38B of the exterior walls 32A, 32B face the inner surfaces 42A, 42B of the interior walls 34A, 34B. The outer surfaces 36A, 36B of the exterior walls 32A, 32B face outwardly in the vehicle lateral direction. The outer surfaces 40A, 40B of the interior walls 34A, 34B face inwardly in the vehicle lateral direction and define a portion of the storage area 26 of the truck bed 14.

The sidewalls 20A, 20B include upper ends 44A, 44B and opposite lower ends 46A, 46B. The lower ends 46A, 46B are positioned closer to the floor 18 of the truck bed 14 than the upper ends 44A, 44B. The sidewalls 20A, 20B include elongated cavities 48A, 48B that are defined between the inner surfaces 38A, 38B of the exterior walls 32A, 32B and the inner surfaces 42A, 42B of the interior walls 34A, 34B. The elongated direction of the elongated cavities 48A, 48B extends parallel to the vehicle longitudinal direction. The elongated cavities 48A, 48B extend from the upper ends 44A, 44B towards the lower ends 46A, 46B of the sidewalls 20A, 20B. The upper ends 44A, 44B of the sidewalls 20A, 20B include elongated openings 50A, 50B that permit access to the elongated cavities 48A, 48B.

The sidewalls 20A, 20B include lids 52A, 52B that are hingedly connected to the sidewalls 20A, 20B by hinges 54A, 54B. The hinges 54A, 54B are positioned on an inward side in the vehicle lateral direction with respect to the elongated openings 50A, 50B. As will be described in greater detail below, the lids 52A, 52B are moveable between a closed position and an open position.

As shown in FIG. 2A, the lids 52A, 52B are in the closed position such that the lids 52A, 52B extend outwardly in the vehicle lateral direction to cover the elongated openings 50A, 50B so as to inhibit access of the elongated cavities 48A, 48B from the elongated openings 50A, 50B. It is appreciated, of course, that the hinges 54A, 54B may be positioned on an outward side in the vehicle lateral direction with respect to the elongated openings 50A, 50B, and that in the closed position the lids 52A, 52B extend inwardly in the vehicle lateral direction to cover the elongated openings 50A, 50B so as to inhibit access of the elongated cavities 48A, 48B from the elongated openings 50A, 50B.

Referring to FIGS. 1, 2A, and 2B, the truck bed height extension assembly 16 includes a pair of side panels 56A, 56B and a pair of actuators 58A, 58B. Each side panel 56A, 56B includes a top (distal) end 60A, 60B, an opposite bottom (proximate) end 62A, 62B, an outer side 64A, 64B, an opposite inner side 66A, 66B, a front end 68A, 68B, and an opposite rear end 70A, 70B. The side panels 56A, 56B have a generally planar shape with a longitudinal direction that extends parallel with the vehicle longitudinal direction.

The actuators 58A, 58B include an actuator base 72A, 72B and an extendable arm 74A, 74B. The actuators 58A, 58B are positioned within the elongated cavities 48A, 48B. The actuator base 72A, 72B may be connected to the lower ends 46A, 46B of the sidewalls 20A, 20B. Each extendable arm 74A, 74B has one end connected to bottom ends 62A, 62B of the side panels 56A, 56B and an opposite end connected to the actuator bases 72A, 72B. The actuators 58A, 58B are optionally mechanical actuators, hydraulic actuators, pneumatic actuators, and/or electric actuators.

The actuators 58A, 58B are linear actuators that linearly displace the side panels 56A, 56B, in the vehicle vertical direction, between a retracted position and an extended position upon movement of the extendable arm 74A, 74B from an unactuated state to an actuated state.

In some embodiments, the actuators 58A, 58B are actuated such that the extendable arms 74A, 74B are moved between the unactuated state and the actuated state by triggering an input switch 76. The input switch 76 is electronically connected to the actuators 58A, 58B by a wired or a wireless connection. In some embodiments, the input switch 76 is positioned on an exterior of the pickup truck 10. For example, the input switch 76 is optionally positioned on the exterior wall 32A of the sidewall 20A, the rear wall 24, the interior wall 34B of the sidewall 20B as shown in FIG. 1, or the input switch 76 is positioned on the floor 18 of the truck bed 14. In some embodiments, a plurality of input switches 76 may be provided for the pickup truck 10 including in or on the truck bed 14 or in the passenger cabin 12.

In some other embodiments, the actuators 58A, 58B are actuated such that that the extendable arms 74A, 74B are moved between the unactuated state and the actuated state using a remote device 78. For example, the remote device 78 is optionally a key fob, a smartphone, or a mobile device. The remote device 78 transmits a wireless signal to actuate the actuators 58A, 58B to move the extendable arms 74A, 74B between the unactuated state and the actuated state.

Referring to FIG. 2A, the side panels 56A, 56B are in the retracted position and the extendable arms 74A, 74B are in the unactuated state. In the retracted position, the side panels 56A, 56B are positioned within the elongated cavities 48A, 48B. Specifically, the side panels 56A, 56B are positioned such that the top ends 60A, 60B are positioned below the upper end 44A, 44b of the sidewalls 20A, 20B. As the side panels 56A, 56B are in the retracted position with the top ends 60A, 60B positioned below the upper ends 44A, 44B of the sidewalls 20A, 20B, the lids 52A, 52B are in the closed position.

Referring to FIG. 2B, the side panels 56A, 56B are in the extended position and the extendable arms 74A, 74B are in the actuated state. In the extended position, the side panels 56A, 56B are positioned so as to extend at least partially outside or beyond the elongated cavities 48A, 48B. The side panels 56A, 56B are positioned such that the top ends 60A, 60B are positioned above the upper end 44A, 44b of the sidewalls 20A, 20B. As the side panels 56A, 56B are in the extended position with the top ends 60A, 60B positioned above the upper ends 44A, 44B of the sidewalls 20A, 20B, the lids 52A, 52B are in the open position.

As discussed above, the actuation of the extendable arms 74A, 74B from the unactuated state to the actuated state linearly displaces the side panels 56A, 56B from the retracted position towards the extended position. Further, the movement of the side panels 56A, 56B from the retracted position to the extended position also moves the lids 52A, 52B from the closed position to the open position as the top ends 60A, 60B of the side panels 56A, 56B contact the lids 52A, 52B which are rotated about the hinges 54A, 54B to the open position.

In the extended position, a height of the sidewalls 20A, 20B of the truck bed 14 is extended so as to increase a storage capacity of the storage area 26. Specifically, a height of the truck bed 14 at the sidewalls 20A, 20B is increased from a height H1 to a height H2. The height H1 is a height from the floor 18 to an upper most portion of the sidewalls 20A, 20B when the side panels 56A, 56B are in the retracted position, specifically, the height from the floor 18 to the upper end 44A, 44b of the sidewalls 20A, 20B. The height H2 is a height from the floor 18 to an upper most portion of the sidewalls 20A, 20B when the side panels 56A, 56B are in the extended position, specifically, the height from the floor 18 to the top end 60A, 60B of the side panels 56A, 56B. In some embodiments, the side panels 56A and 56B may increase the height H1 by at least about 15 percent, such as at least about 30 percent, such as at least about 50 percent. In some embodiments, the distance the side panels 56A and 56B extend beyond the upper ends 44A and 44B may be selectable between a minimum distance and a maximum distance. Further, the side panels 56A and 56B may be operated simultaneously and/or independently.

In some embodiments, the top ends 60A, 60B of the side panels 56A, 56B extend flush and/or coplanar with the upper ends 44A, 44B of the sidewalls 20A, 20B such that the top ends 60A, 60B are received within the elongated openings 50A, 50B. In some other embodiments, when the side panels 56A, 56B are in the retracted position a distance between the top ends 60A, 60B of the side panels 56A, 56B and the floor 18, in the vehicle vertical direction, is less than a distance between the top ends 60A, 60B of the side panels 56A, 56B and the floor 18 when in the extended position.

Figure 3A:
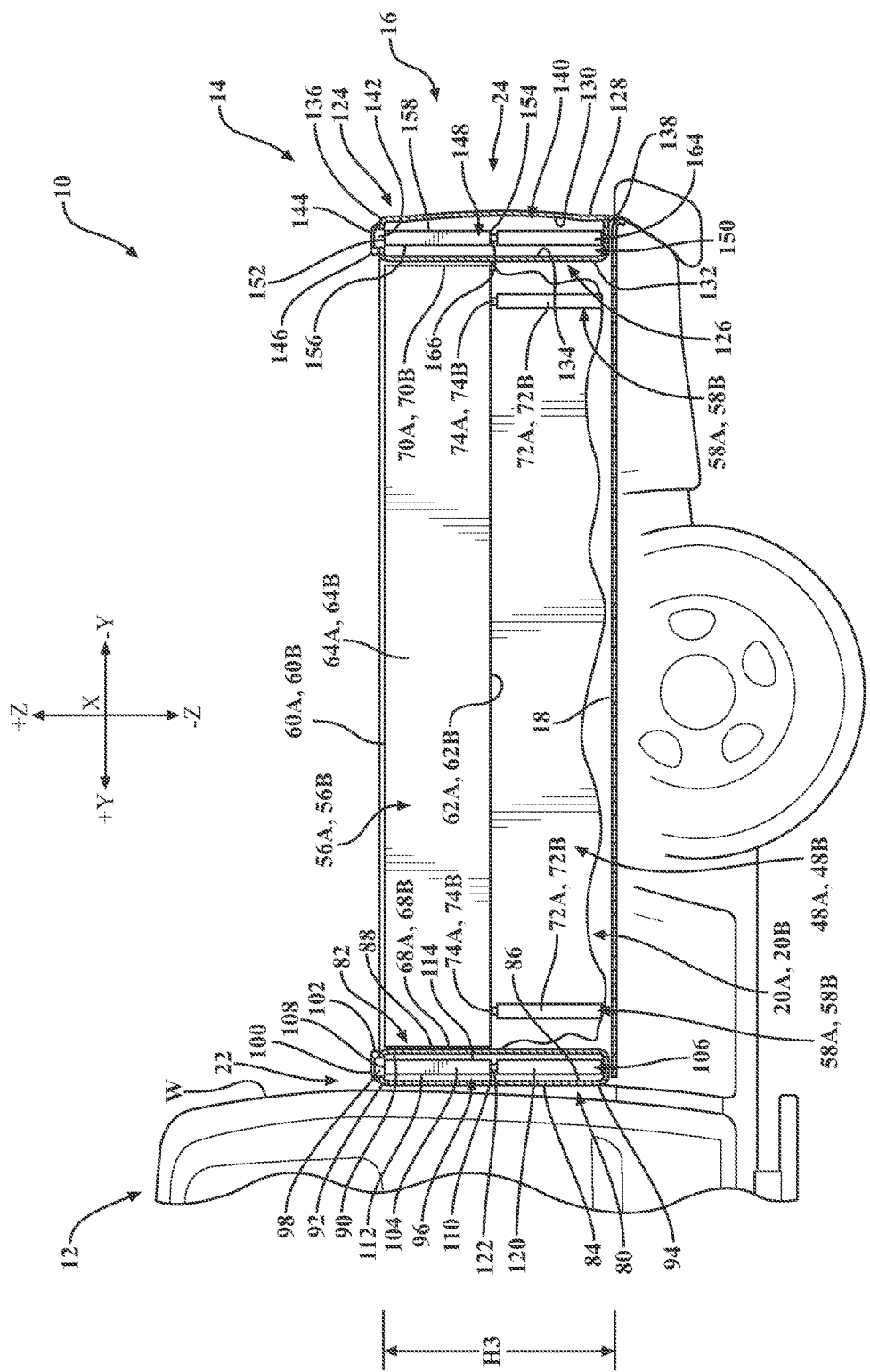
FIG. 3A schematically depicts a partial cross section of a side view of the truck bed of the pickup truck of FIG. 1 with the pair of side panels, the rear panel, and the front panel in the retracted position, according to one or more embodiments described and illustrated herein.
Figure 3B:
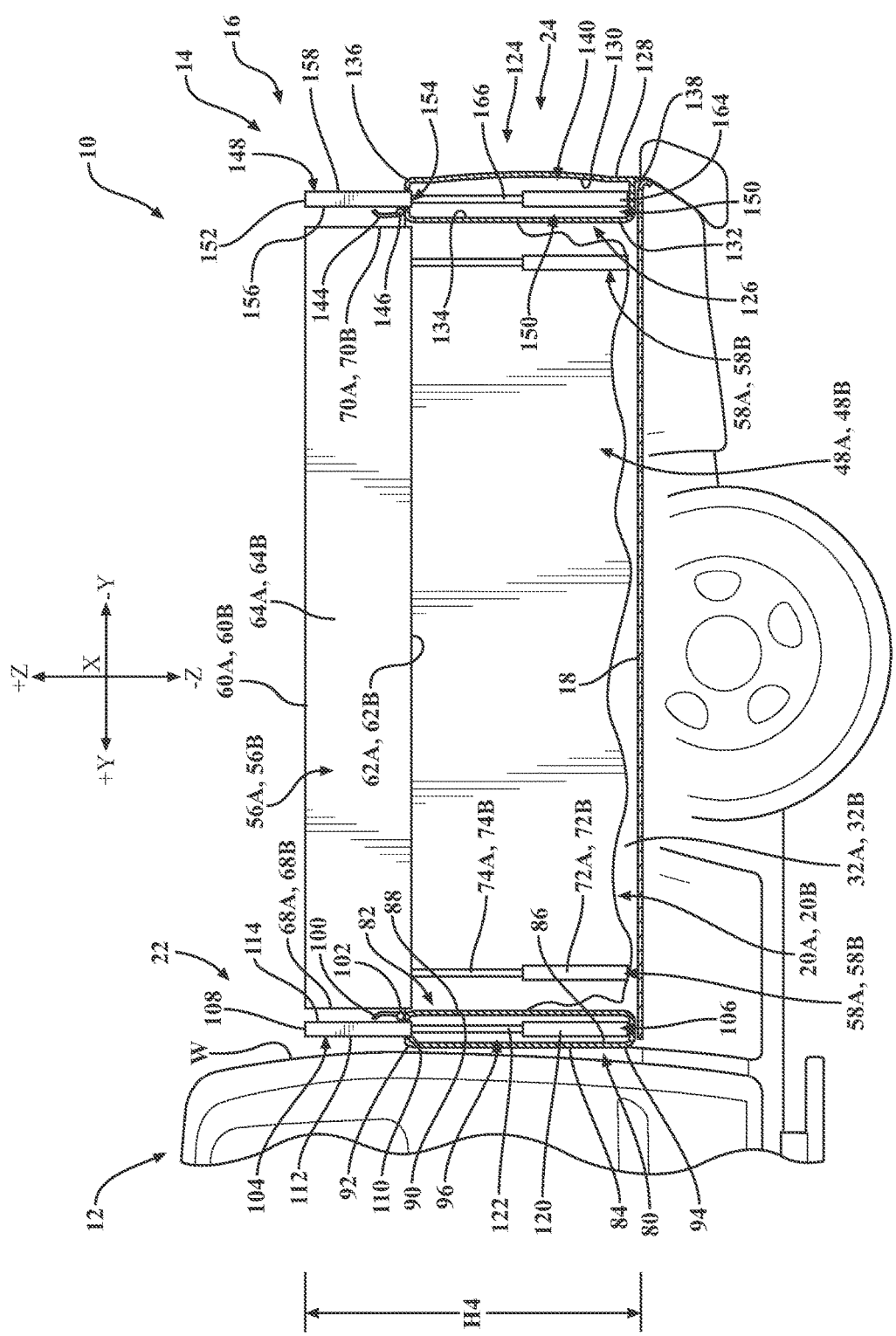
FIG. 3B schematically depicts a partial cross section of a side view of the truck bed of the pickup truck of FIG. 1 with the pair of side panels, the rear panel, and the front panel in the extended position, according to one or more embodiments described and illustrated herein.

Referring to FIGS. 1, 3A, and 3B, the front wall 22 includes an exterior wall 80, and an opposite interior wall 82. The exterior wall 80 includes an outer surface 84 and an opposite inner surface 86. The interior wall 82 includes an outer surface 88 and an opposite inner surface 90. The inner surface 86 of the exterior wall 80 faces the inner surface 90 of the interior wall 82. The outer surface 84 of the exterior wall 80 faces forward in the vehicle longitudinal direction and the outer surface 88 of the interior wall 82 faces rearward in the vehicle longitudinal direction and define a portion of the storage area 26 of the truck bed 14.

The front wall 22 includes an upper end 92 and an opposite lower end 94. The lower end 94 is positioned closer to the floor 18 of the truck bed 14 than the upper end 92. The front wall 22 includes an elongated cavity 96 that is defined between the inner surface 86 of the exterior wall 80 and the inner surface 90 of the interior wall 82. The elongated direction of the elongated cavity 96 extends parallel to the vehicle lateral direction. The elongated cavity 96 extends from the upper end 92 towards the lower end 94 of the front wall 22. The upper end 92 includes an elongated opening 98 that permits access to the elongated cavity 96.

The front wall 22 includes a lid 100 that is hingedly connected to the front wall 22 by a hinge 102. The hinge 102 is positioned on a rearward side in the vehicle longitudinal direction with respect to the elongated opening 98. As will be described in greater detail below, the lid 100 is moveable between a closed position and an open position.

The rear wall 24 includes an exterior wall 124, and an opposite interior wall 126. The exterior wall 124 includes an outer surface 128 and an opposite inner surface 130. The interior wall 126 includes an outer surface 132 and an opposite inner surface 134. The inner surface 130 of the exterior wall 124 faces the inner surface 134 of the interior wall 126. The outer surface 128 of the exterior wall 124 faces rearward in the vehicle longitudinal direction and the outer surface 132 of the interior wall 126 faces forward in the vehicle longitudinal direction and define a portion of the storage area 26 of the truck bed 14.

The rear wall 24 includes an upper end 136 and an opposite lower end 138. The lower end 138 is positioned closer to the floor 18 of the truck bed 14 than the upper end 136. The rear wall 24 includes an elongated cavity 140 that is defined between the inner surface 130 of the exterior wall 124 and the inner surface 134 of the interior wall 126. The elongated direction of the elongated cavity 140 extends parallel to the vehicle lateral direction. The elongated cavity 140 extends from the upper end 136 towards the lower end 138 of the rear wall 24. The upper end 136 includes an elongated opening 142 that permits access to the elongated cavity 140.

The rear wall 24 includes a lid 144 that is hingedly connected to the rear wall 24 by a hinge 146. The hinge 146 is positioned on a forward side in the vehicle longitudinal direction with respect to the elongated opening 142. As will be described in greater detail below, the lid 144 is moveable between a closed position and an open position.

As shown in FIG. 3A, the lid 100 on the front wall 22 is in the closed position such that the lid 100 extends forwardly in the vehicle longitudinal direction to cover the elongated opening 98 so as to inhibit access of the elongated cavity 96 from the elongated opening 98. It is appreciated, of course, that the hinge 102 may be positioned on an forward side in the vehicle longitudinal direction with respect to the elongated opening 98, and that in the closed position the lid 100 extends rearward in the vehicle longitudinal direction to cover the elongated opening 98 so as to inhibit access of the elongated cavity 96 from the elongated opening 98.

The lid 144 on the rear wall 24 is in the closed position such that the lid 144 extends rearward in the vehicle longitudinal direction to cover the elongated opening 142 so as to inhibit access of the elongated cavity 140 from the elongated opening 142. It is appreciated, of course, that the hinge 146 may be positioned on a rearward side in the vehicle longitudinal direction with respect to the elongated opening 142, and that in the closed position the lid 144 extends forward in the vehicle longitudinal direction to cover the elongated opening 142 so as to inhibit access of the elongated cavity 140 from the elongated opening 142.

Referring to FIGS. 1, 3A, and 3B, the truck bed height extension assembly 16 include may also include a front panel 104, a front actuator 106, a rear panel 148, and a rear actuator 150. The front panel includes a top (distal) end 108, an opposite bottom (proximate) end 110, a front side 112, an opposite rear side 114, a front end 116, and an opposite rear end 118. The front panel 104 has a generally planar shape with a longitudinal direction that extends parallel with the vehicle lateral direction. The rear panel 148 includes a top (distal) end 152, an opposite bottom (proximate) end 154, a front side 156, an opposite rear side 158, a front end 160, and an opposite rear end 162. The rear panel 148 has a generally planar shape with a longitudinal direction that extends parallel with the vehicle lateral direction.

The front actuator 106 and the rear actuator 150 are similar to the actuators 58A, 58B. The front actuator 106 includes an actuator base 120 and an extendable arm 122. The front actuator 106 is positioned within the elongated cavity 96 and the rear actuator 150 is positioned within the elongated cavity 140. The front actuator 106 is a linear actuator that linearly displaces the front panel 104 in the vehicle vertical direction, between a retracted position and an extended position upon movement of the extendable arm 166 from an unactuated state to an actuated state. The rear actuator 150 includes an actuator base 164 and an extendable arm 166. The rear actuator 150 is a linear actuator that linearly displaces the rear panel 148 in the vehicle vertical direction, between a retracted position and an extended position upon movement of the extendable arm 166 from an unactuated state to an actuated state.

It is appreciated that the front actuator 106 and the rear actuator 150 are actuated by the input switch 76 and/or the remote device 78. In some embodiments, the actuators 58A, 58B, front actuator 106, and the rear actuator 150 are independently actuated by the input switch 76 or the remote device 78. In some other embodiments, the actuators 58A, 58B, front actuator 106, and the rear actuator 150 are simultaneously actuated by the input switch 76 or the remote device 78.

Referring to FIG. 3A, the front panel 104 and the rear panel 148 are in the retracted position and the extendable arm 122 of the front actuator 106 and the extendable arm 166 of the rear actuator 150 are in the unactuated state. In the retracted position, the front panel 104 is positioned within the elongated cavity 96 and the rear panel 148 is positioned within the elongated cavity 140. Specifically, the top end 108 of the front panel 104 is positioned below the upper end 92 of the front wall 22, and the top end 152 of the rear panel 148 is positioned below the upper end 136 of the rear wall 24. As the front panel 104 is in the retracted position with the top end 108 positioned below the upper end 92 of the front wall 22, the lid 100 is in the closed position. Similarly, as the rear panel 148 is in the retracted position with the top end 152 positioned below the upper end 136 of the rear wall 24, the lid 144 is in the closed position.

Referring to FIG. 3B, the front panel 104 and the rear panel 148 are in the extended position and the extendable arm 122 of the front actuator 106 and the extendable arm 166 of the rear actuator 150 are in the actuated state. In the extend position, the front panel 104 is positioned so as to extend at least partially outside or beyond the elongated cavity 96 and the rear panel 148 is positioned so as to extend at least partially outside or beyond the elongated cavity 140. The front panel 104 is positioned such that the top end 108 is positioned above the upper end 92 of the front wall 22 and the rear panel 148 is positioned such that the top end 152 is positioned above the upper end 136 of the rear wall 24. As the front panel 104 is in the extended position with the top end 108 positioned above the upper end 92 of the front wall 22, the lid 100 is in the open position and as the rear panel 148 is in the extended position with the top end 152 positioned above the upper end 136 of the rear wall 24, the lid 144 is in the open position.

In the extended position a height of the front wall 22 and the rear wall 24 of the truck bed 14 is extended so as to increase a storage capacity of the storage area 26. Specifically, a height of the truck bed 14 at the front wall 22 and the rear wall 24 is increased from a height H3 to a height H4. The height H3 is a height from the floor 18 to an upper most portion of the front wall 22 and the rear wall 24 when the front panel 104 and the rear panel 148 are in the retracted position, specifically, the height from the floor 18 to the upper end 92 of the front wall 22 and the upper end 136 of the rear wall 24. The height H4 is a height from the floor 18 to an upper most portion of the front panel 104 and rear panel 148 when the front panel 104 and rear panel 148 are in the extended position, specifically, the height from the floor 18 to the top end 108 of the front panel 104 and the top end 152 of the rear panel 148. In some embodiments, the front panel 104 and the rear panel 148 may increase the height H3 by at least about 15 percent, such as at least about 30 percent, such as at least about 50 percent. In some embodiments, the distance the front panel 104 and the rear panel 148 extend beyond the upper ends 92 and 136 may be selectable between a minimum distance and a maximum distance. Further, the front panel 104 and the rear panel 148 may be operated simultaneously and/or independently.

In some embodiments, the top end 108 of the front panel 104 and the top end 152 of the rear panel 148 extend flush and/or coplanar with the upper end 92 of the front wall 22 and the upper end 136 of the rear wall 24, respectively, such that the top end 108 of the front panel 104 and the top end 152 of the rear panel 148 are received within the elongated opening 98 of the front wall 22 and the elongated open 142 of the rear wall 24.

In some other embodiments, when the front panel 104 and the rear panel 148 are in the retracted position a distance between the floor 18 and the top end 108 of the front panel 104 and the top end 152 of the rear panel 148, in the vehicle vertical direction, is less than a distance between the floor 18 and the top end 108 of the front panel 104 and the top end 152 of the rear panel 148 when in the extended position.

In some other embodiments, the front panel 104 may act to protect a window W located in the rear side of the passenger cabin 12 from coming in contact with the contents within the storage area 26 of the truck bed 14. Specifically, when the front panel 104 is in the extended positon, it may at least partially overlap with the window W when view in the vehicle longitudinal direction and is located between the window W and the storage area 26.

In some other embodiments, the rear panel 148 may be used to extend the length of the truck bed 14 in the vehicle longitudinal direction. When the rear wall 24 is in the open position it may be parallel with the vehicle longitudinal direction and extending away from the storage area 26 so as to extend the length of the truck bed 14 by the length of the rear wall 24. The rear panel 148 may then be extended to further increase the length of the truck bed 14, specifically the length of the truck bed 14 may be extended a total distance equal to the height H4 of rear wall 24 and rear panel 148 when the rear panel 148 is in an extended position.

Figure 4A:
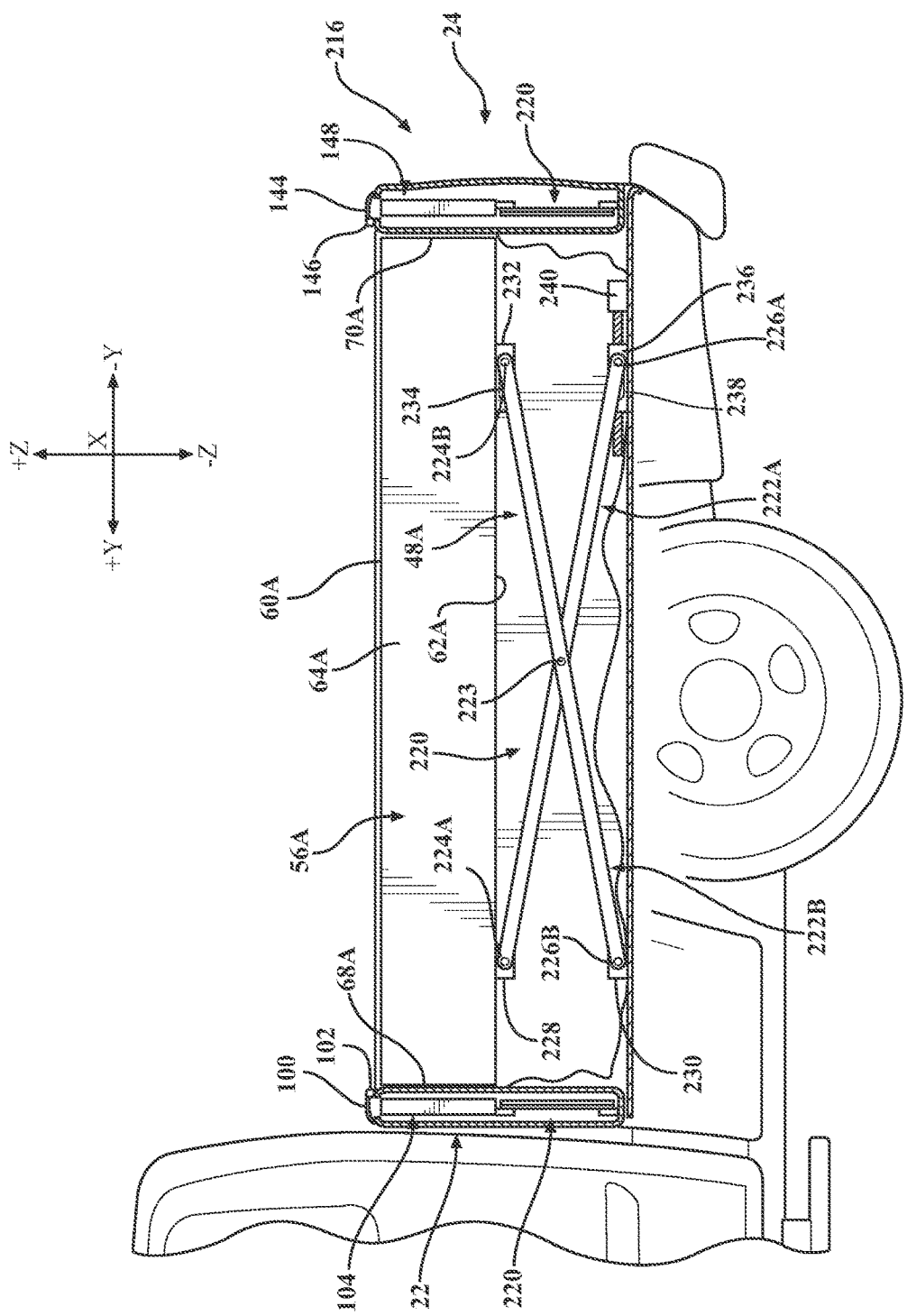
FIG. 4A schematically depicts a partial cross section of a side view of a truck bed of a pickup truck, with the pair of side panels, the rear panel, and the front panel in the extended position, according to one or more embodiments described and illustrated herein.
Figure 4B:
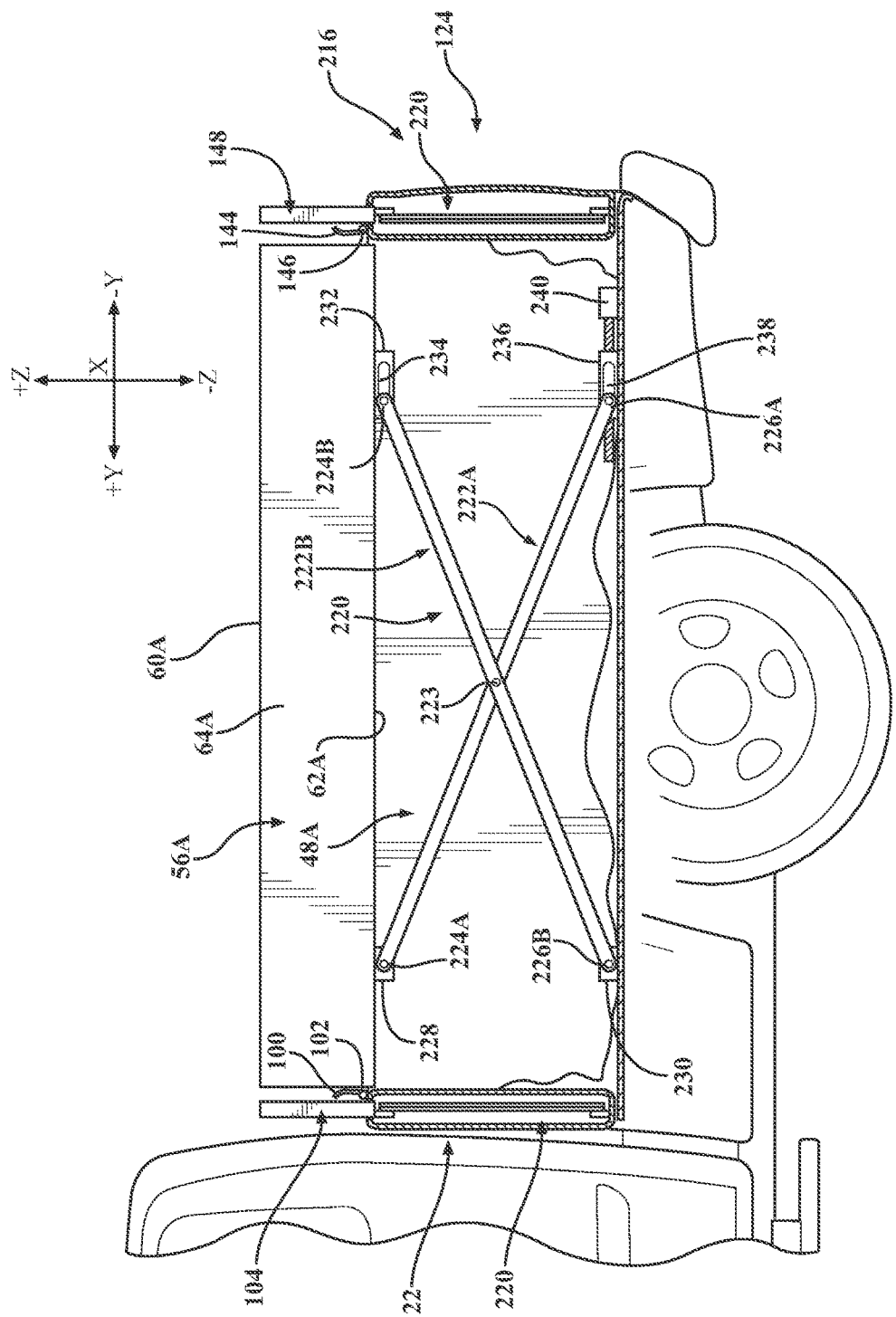
FIG. 4B schematically depicts a partial cross section of a side view of the truck bed of the pickup truck of FIG. 4A with the pair of side panels, the rear panel, and the front panel in the retracted position, according to one or more embodiments described and illustrated herein.

Referring to FIGS. 4A and 4B, a truck bed height extension assembly is generally illustrated at 216. The truck bed height extension assembly 216 is similar to the truck bed height extension assembly 16 except that the actuators 58A, 58B, the front actuator 106, and the rear actuator 150 are replaced with actuators 220. Each of the actuators 220 is a scissor lift assembly having substantially similar structure and as such, description of only the actuator 220 provided to linearly displace the side panel 56A will be provided. The actuator 220 includes a pair of legs 222A, 222B pivotally connected by a fastener 223 at a point substantially near mid-points of the legs 222A, 222B.

Each leg 222A, 222B includes a first end 224A, 224B and an opposite second end 226A, 226B. The first end 224A of the leg 222A is pivotally connected to a bracket 228 connected to the bottom end 62A of the side panel 56A. The first end 224B of the leg 222B is connected to the bracket 232 so as to pivot and slide within a slot 234. The bracket 232 is connected to the bottom end 62A of the side panel 56A. The second end 226B of the leg 222B is pivotally connected to a bracket 230 secured to the sidewall 20A. The second end 226A of the leg 222A is connected to a bracket 236 having a slot 238. The bracket 236 is secured to the sidewall 20A. The second end 226A of the leg 222A is connected to the bracket 236 so as to pivot and slide within the slot 238.

The actuator 220 further includes a drive mechanism 240 that is connected to the second end 226A of the leg 222A. The drive mechanism 240 is configured such that when engaged the drive mechanism 240 will move the second end 226A of the leg 222A linearly along the slot 238 thereby linearly displacing the side panel 56A between the retracted position and the extended position.

The actuator 220 is provided to linearly displace the side panel 56A and is positioned within the elongated cavity 48A of the sidewall 20A. The actuators 220 provided to linearly displace the side panel 56B, the front panel 104, and the rear panel 148 are similarly provided within the respective elongated cavity 48B of the sidewall 20B, the elongated cavity 96 of the front wall 22, and the elongated cavity 140 of the rear wall 24. The actuators 220 provided to linearly displace the side panels 56A, 56B, the front panel 104, and the rear panel 148 between the retracted position and the extended position are actuated by at least one of the input switch 76 and the remote device 78.

Figure 5A:
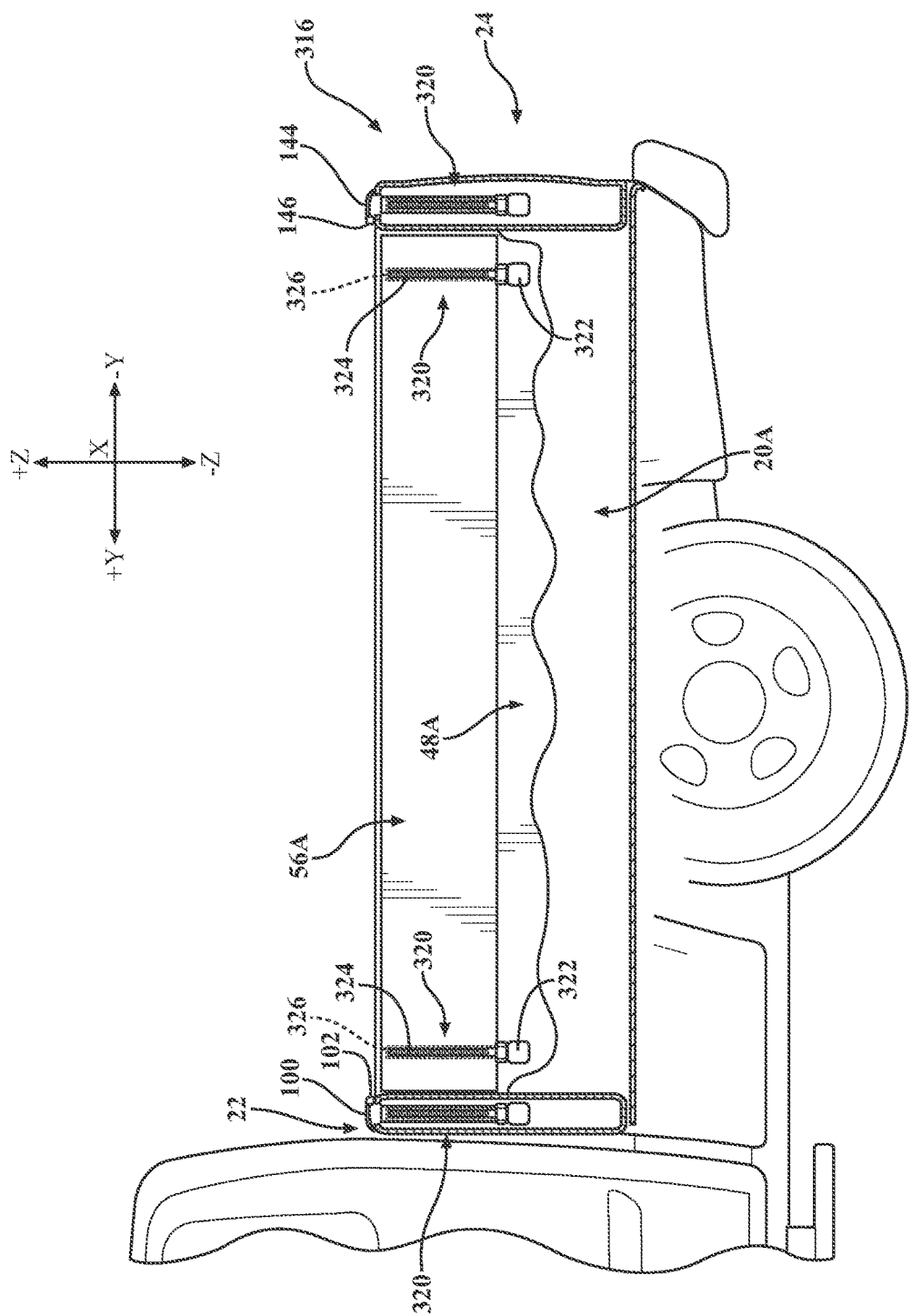
FIG. 5A schematically depicts a partial cross section of a side view of a truck bed of a pickup truck with the pair of side panels, the rear panel, and the front panel in the extended position, according to one or more embodiments described and illustrated herein.

Referring to FIGS. 5A and 5B, a truck bed height extension assembly is generally illustrated at 316. The truck bed height extension assembly 316 is similar to the truck bed height extension assembly 16 except that the actuators 58A, 58B, the front actuator 106, and the rear actuator 150 are replaced with actuators 320. As each of the actuators 320 is a threaded bore assembly having substantially similar structure, description of only the actuator 320 provided to linearly displace the side panel 56A will be provided The actuator 320 includes a motor 322, a threaded shank 324 connected to the motor 322, and a threaded bore 326 that is configured to engage with the threaded shank 324. The motor 322 and the threaded shank 324 are provided within the elongated cavity 48A of the sidewall 20A. The threaded bore 326 is provided in the side panel 56A extending from the bottom end 62 towards the top end 60. It is appreciated, of course, that the actuator 320 may include a plurality of motors 322, threaded shanks 324, and threaded bores 326.

The motor 322 is configured to rotate the threaded shank 324 in a first direction and an opposite second direction. When rotated in the first direction the threaded shank 324 rotates out of the threaded bore 326 to increase a distance between the bottom end 62 of the side panel 56A and the floor 18 so as to move the side panel 56A from the retracted position towards the extended position. When rotated in the second direction, the threaded shank 324 rotates into the threaded bore 326 to decrease a distance between the bottom end 62 of the side panel 56A and the floor 18 so as to move the side panel 56A from the extended position towards the retracted position.

The actuator 320 is provided to linearly displace the side panel 56A and is positioned within the elongated cavity 48A of the sidewall 20A. The actuators 320 provided to linearly displace the side panel 56B, the front panel 104, and the rear panel 148 are similarly provided within the respective elongated cavity 48B of the sidewall 20B, the elongated cavity 96 of the front wall 22, and the elongated cavity 140 of the rear wall 24. The actuators 320 provided to linearly displace the side panels 56A, 56B, the front panel 104, and the rear panel 148 between the retracted position and the extended position are actuated by at least one of the input switch 76 and the remote device 78.

Figure 6A:
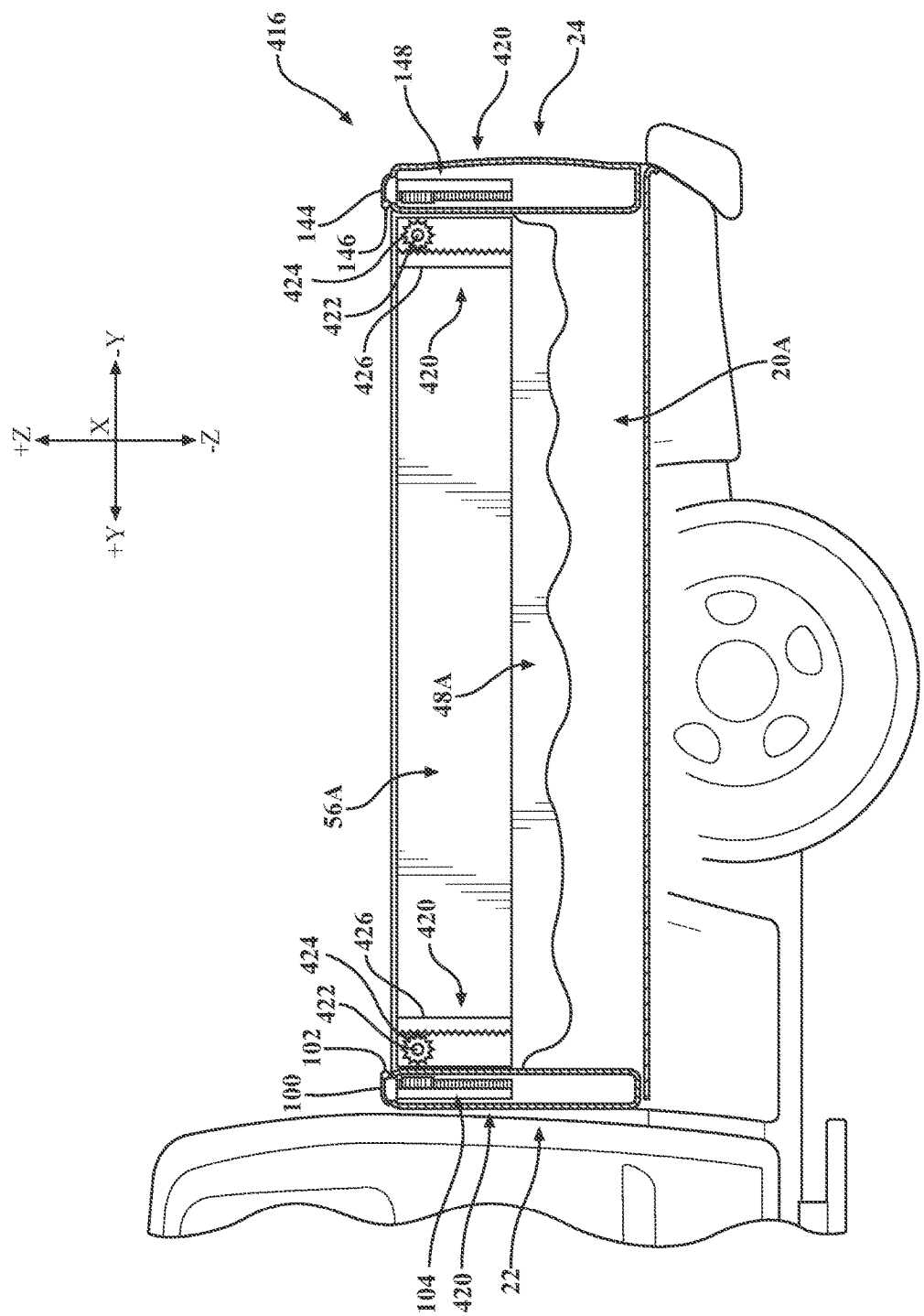
FIG. 6A schematically depicts a partial cross section side view of a truck bed of a pickup truck with the pair of side panels, the rear panel, and the front panel in the extended position, according to one or more embodiments described and illustrated herein.
Figure 6B:
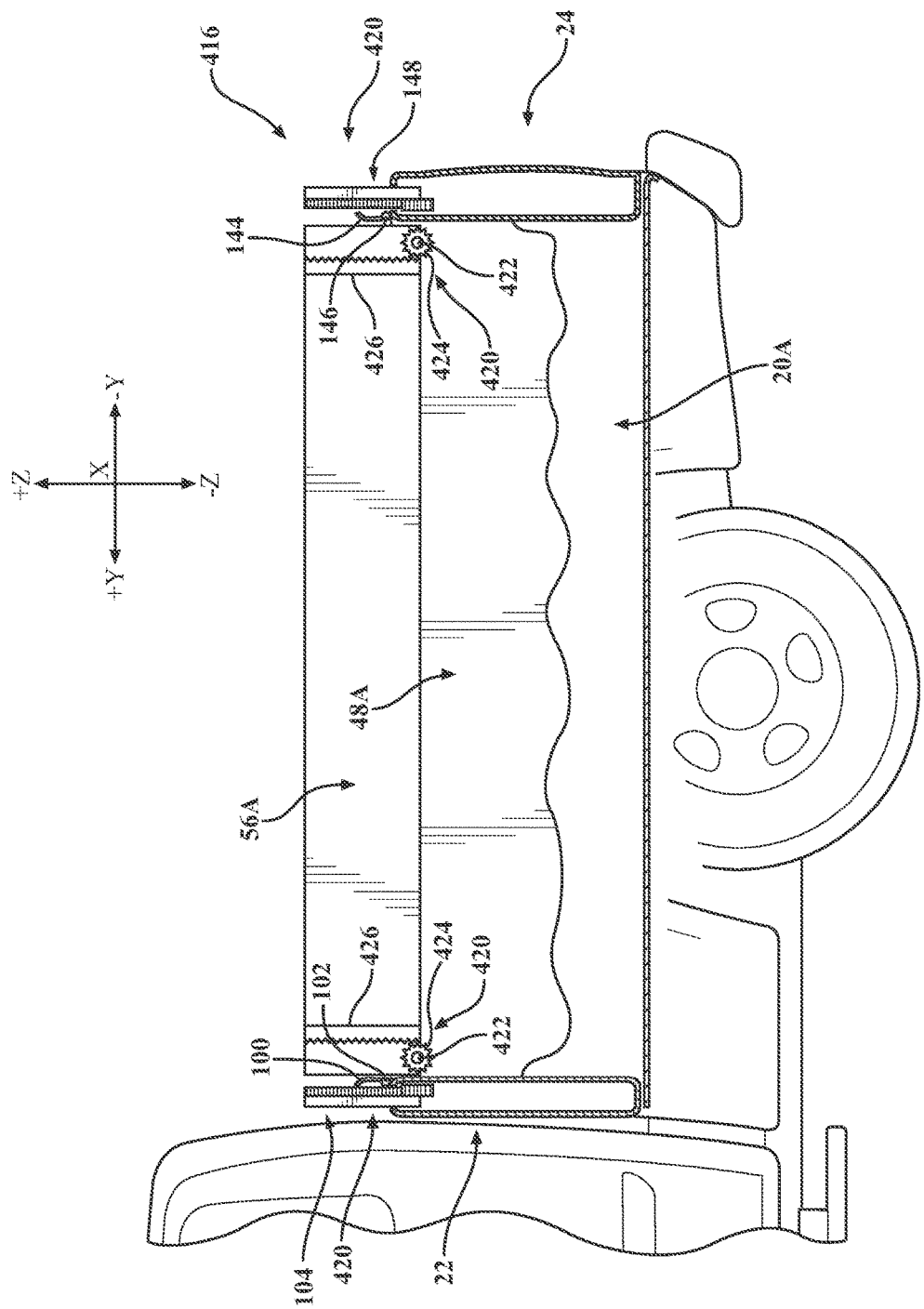
FIG. 6B schematically depicts a partial cross section of a side view of the truck bed of the pickup truck of FIG. 6A with the pair of side panels, the rear panel, and the front panel in the retracted position, according to one or more embodiments described and illustrated herein.

Referring to FIGS. 6A and 6B, a truck bed height extension assembly is generally illustrated at 416. The truck bed height extension assembly 416 is similar to the truck bed height extension assembly 16 except that the actuators 58A, 58B, the front actuator 106, and the rear actuator 150 are replaced with actuators 420. As each of the actuators 420 is a rack and pinion assembly having substantially similar structure, description of only the actuator 420 provided to linearly displace the side panel 56A will be provided The actuator 420 includes a motor 422 connected to a pinon gear 424 that engages a rack gear 426 provided on the side panel 56A. In some embodiments, the rack gear 426 is integrated into the side panel 56A on at least one of the front end 68A, the rear end 70A, the outer side 64A, and the inner side 66A. The motor 422 is configured to rotate the pinion gear 424 in a first direction and an opposite second direction. Upon rotation of the pinion gear 424 in the first direction, the pinion gear 424 engages the rack gear 426 to move the side panel 56A from the retracted position towards the extended position. Upon rotation of the pinion gear 424 in the second direction, the pinion gear 424 engages the rack gear 426 to move the 56A from the extended position towards the retracted position.

It should be appreciated that although FIGS. 6A and 6B illustrate a pair of actuators 420, the truck bed height extension assembly 416 may include only a single actuator 420 for each of the side panels 56A, 56B, the front panel 104, and the rear panel 148.

The actuator 420 is provided to linearly displace the side panel 56A is positioned within the elongated cavity 48A of the sidewall 20A. The actuators 420 provided to linearly displace the side panel 56B, the front panel 104, and the rear panel 148 are similarly provided within the respective elongated cavity 48B of the sidewall 20B, the elongated cavity 96 of the front wall 22, and the elongated cavity 140 of the rear wall 24. The actuators 420 provided to linearly displace the side panels 56A, 56B, the front panel 104, and the rear panel 148 between the retracted position and the extended position are actuated by at least one of the input switch 76 and the remote device 78.

Figure 7B:
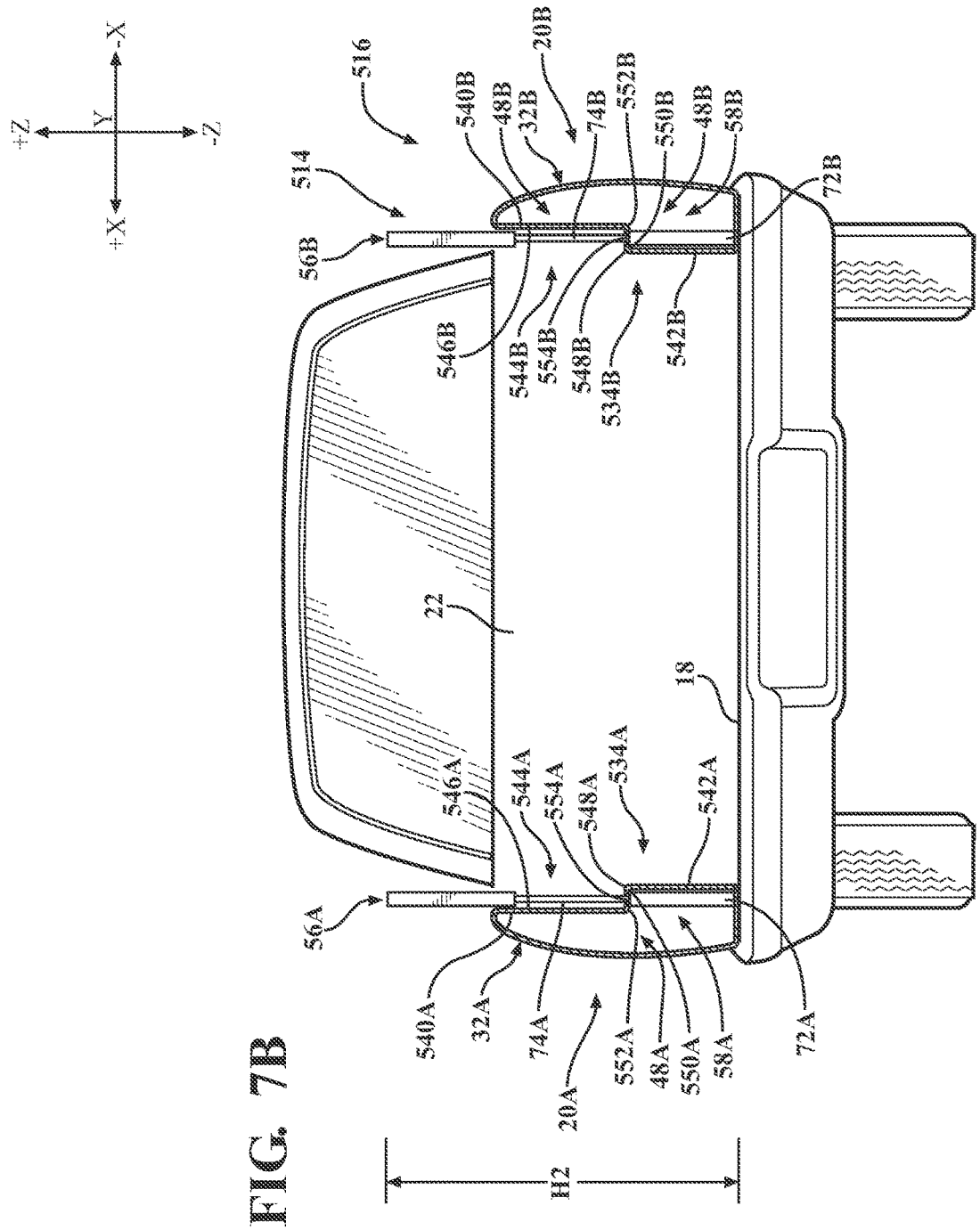
FIG. 7B schematically depicts a partial cross section of a rear view of the truck bed of the pickup truck of FIG. 7A with the pair of side panels in the extended positon, according to one or more embodiments described and illustrated herein.

Referring to FIGS. 7A and 7B, a truck bed height extension assembly is generally illustrated at 516. The truck bed height extension assembly 516 is similar to the truck bed height extension assembly 16 except that the sidewalls 20A, 20B include recessed portions and that the side panels 56A, 56B are provided in the recessed portions instead of elongated cavities 96A, 96B. Specifically, the truck bed height extension assembly 516 includes a truck bed 514 that includes a floor 18, a pair of sidewalls 20A, 20B, a front wall 22, and a rear wall 24. The pair of sidewalls 20A, 20B includes exterior walls 32A, 32B and opposite interior walls 534A, 534B.

The interior walls 534A, 534B include outer surfaces 540A, 540B that face outwardly in the vehicle lateral direction. The interior walls 534A, 534B include inner surfaces 542A, 542B and recessed portions 544A, 544B. The inner surfaces 542A, 542B and the recessed portions 544A, 544B face inwardly in the vehicle lateral direction. The recessed portions 544A, 544B are positioned above the inner surfaces 542A, 542B in the vehicle longitudinal direction.

The recessed portions 544A, 544B include recessed surfaces 546A, 546B and shoulder portions 548A, 548B. The recessed surfaces 546A, 546B are recessed outwardly with respect to the inner surfaces 542A, 542B. Specifically, a distance D1 between the inner surfaces 542A, 542B is less than a distance D2 between the recessed surfaces 546A, 546B in the vehicle lateral direction.

The inner surfaces 542A, 542B extend upwardly, in the vehicle vertical direction, from the floor 18 to top edges 550A, 550B. The recessed surfaces 546A, 546B extend downwardly, in the vehicle vertical direction, from the upper end 44A, 44B of the sidewalls 20A, 20B to bottom edges 552A, 552B. The shoulder portions 548A, 548B extend outwardly, in the vehicle lateral direction, to traverse between the top edges 550A, 550B of the inner surfaces 542A, 542B and the bottom edges 552A, 552B of the recessed surfaces 546A, 564B.

The actuators 58A, 58B are partially provided within the elongated cavities 48A, 48B defined between the outer surfaces 540A, 540B of the interior wall 534A, 534B and the inner surfaces 38A, 38B of the exterior wall 32A, 32B. Specifically, the actuator bases 72A, 72B of the actuators 58A, 58B are provided within the elongated cavities 48A, 48B and the extendable arms 74A, 74B extend through apertures 554A, 554B formed in the shoulder portions 548A, 548B.

The actuators 58A, 58B are linear actuators that linearly displace the side panels 56A, 56B, in the vehicle vertical direction, between a retracted position and an extended position upon movement of the extendable arm 74A, 74B from an unactuated state to an actuated state.

Referring to FIG. 7A, the side panels 56A, 56B are in the retracted position and the extendable arms 74A, 74B are in the unactuated stated. In the retracted position, the side panels 56A, 56B are positioned within the recessed portion 544A, 544B. Specifically, the side panels 56A, 56B are positioned such that the top ends 60A, 60B are positioned below the upper end 44A, 44b of the sidewalls 20A, 20B. In the retracted position, the bottom ends 62A, 62B of the side panels 56A, 56B are positioned adjacent the shoulder portions 548A, 548B. In some embodiments, the bottom ends 62A, 62B of the side panels 56A, 56B contact the shoulder portions 548A, 548B.

In some embodiments, an entire surface of the outer side 64A, 64B of the side panels 56A, 56B is covered by the recessed surfaces 546A, 546B. As the outer sides 64A, 64B of the side panels 56A, 56B face the recessed surfaces 546A, 546B and the top ends 60A, 60B of the side panels 56A, 56B are positioned below the upper end 44A, 44b of the sidewalls 20A, 20B, the entire surface of the outer sides 64A, 64B of the sidewalls 20A, 20B is hidden from view when the side panels 56A, 56B are in the retracted position.

Referring to FIG. 7B, the side panels 56A, 56B are in extended position and the extendable arms 74A, 74B are in the actuated state. In the extend position, the side panels 56A, 56B are positioned such that the top ends 60A, 60B are positioned above the upper end 44A, 44b of the sidewalls 20A, 20B.

In the extended position a height of the sidewalls 20A, 20B of the truck bed 514 is extended so as to increase a storage capacity of the storage area 26. Specifically, a height of the truck bed 14 at the sidewalls 20A, 20B is increased from a height H5 to a height H6. The height H5 is a height from the floor 18 to an upper most portion of the sidewalls 20A, 20B when the side panels 56A, 56B are in the retracted position, specifically, the height from the floor 18 to the upper end 44A, 44b of the sidewalls 20A, 20B. The height H6 is a height from the floor 18 to an upper most portion of the sidewalls 20A, 20B when the side panels 56A, 56B are in the extended position, specifically, the height from the floor 18 to the top end 60A, 60B of the side panels 56A, 56B.

In the extended position, a height between the bottom ends 62A, 62B and the floor 18 is greater than a height between the bottom ends 62A, 62B and the floor 18 when the side panels 56A, 56B are in the retracted position. Further, a height between the bottom ends 62A, 62B and the shoulder portions 548A, 548B is greater than a height between the bottom ends 62A, 62B and the 548A, 548B when the side panels 56A, 56B are in the retracted position.

Figure 8A:
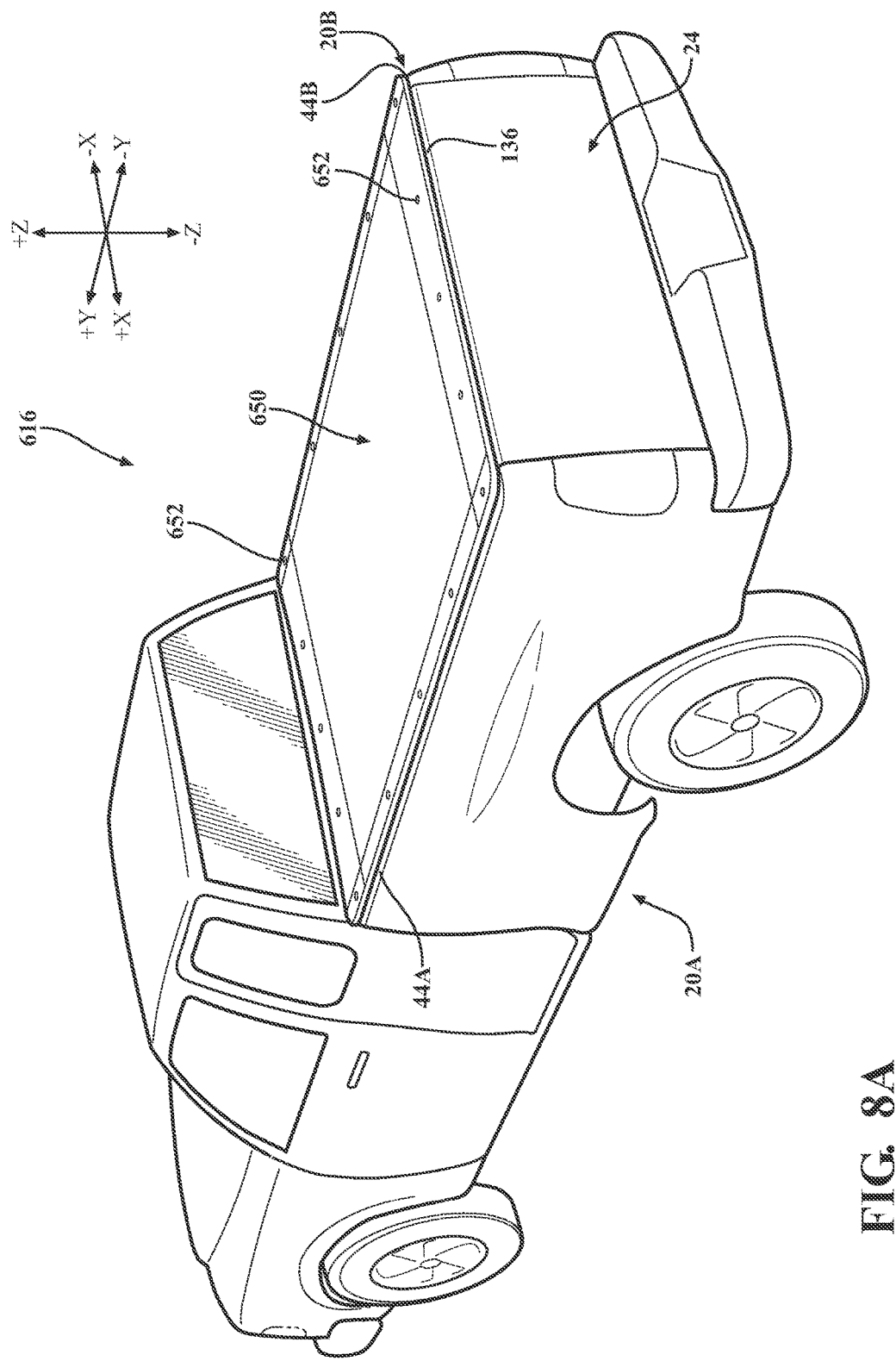
FIG. 8A schematically depicts a perspective view of a pickup truck having a truck bed with a truck bed height extension assembly and a truck bed cover in a lowered position, according to one or more embodiments described and illustrated herein.
Figure 8B:
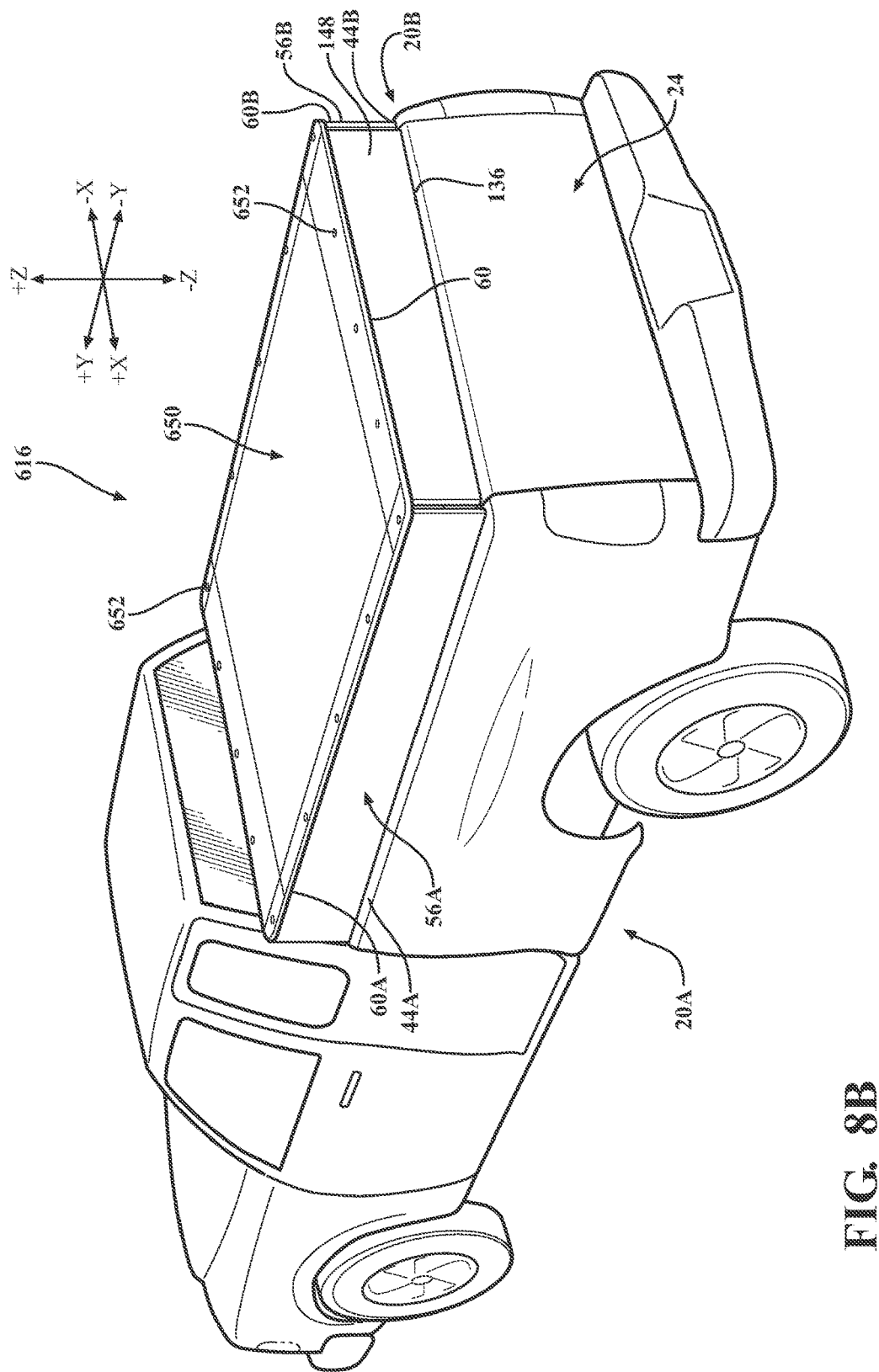
FIG. 8B schematically depicts a perspective view of the pickup truck of FIG. 8A with a pair of side panels, a rear panel, and a front panel in the extended position and the truck bed cover in a raised, according to one or more embodiments described and illustrated herein.

FIGS. 8A and 8B, a truck bed height extension assembly is generally illustrated at 616. The truck bed height extension assembly 616 is similar to the truck bed height extension assembly 16 except that a truck bed cover 650 is provided to cover the storage area 26 of the truck bed 14. The truck bed cover 650 is releasably connected to the side panels 56A, 56B, the front panel 104, and the rear panel 148. Specifically, a plurality of connectors 652 are provided on the truck bed cover 650 and releasably connect the truck bed cover 650 to the top ends 60A, 60B of the side panels 56A, 56B, the top end 108 of the front panel 104, and the top end 152 of the rear panel 148. In some embodiments, the plurality of connectors 652 independently releasably connect the truck bed cover 650 to the side panels 56A, 56B, the front panel 104, and the rear panel 148. As such, the connectors 652 connecting the truck bed cover 650 to the rear panel 148 can be disconnected while the connectors 652 connecting the truck bed cover 650 to the side panels 56A, 56B and the front panel 104 remain connected. Therefore, the rear panel 148 can be disconnected from truck bed cover 650 to allow for the rear wall 24 to move between the closed position and the open position so as to permit access to the storage area 26 without the requirement to remove the truck bed cover 650.

As the truck bed cover 650 is connected to the side panels 56A, 56B, the front panel 104, and the rear panel 148, the truck bed cover 650 is moveable between a lowered position and a raised position upon movement of the side panels 56A, 56B, the front panel 104, and the rear panel 148 between the retracted position and the extended position.

Referring to FIG. 8A, the truck bed cover 650 is in the lowered position as the side panels 56A, 56B, the front panel 104, and the rear panel 148 are in the retracted position. In the lowered position, the truck bed cover 650 extends substantially flush and/or coplanar with the upper ends 44A, 44B of the sidewalls 20A, 20B, the upper end 92 of the front wall 22, and the upper end 136 of the rear wall 24.

Referring to FIG. 8B, the truck bed cover 650 is in the raised position as the side panels 56A, 56B, the front panel 104, and the rear panel 148 are in the extended position. In the raised position, the truck bed cover 650 extends above, in the vehicle vertical direction, the upper ends 44A, 44B of the sidewalls 20A, 20B, the upper end 92 of the front wall 22, and the upper end 136 of the rear wall 24.

In some embodiments, the truck bed cover 650 is optionally a soft cover that is rollable. In some other embodiments, the truck bed cover 650 is a rigid cover that is foldable in rigid sections.

The movement of the truck bed cover 650 to the raised position increases a covered storage capacity of the truck bed 14. Further, as the truck bed cover 650 is connected to the side panels 56A, 56B, the front panel 104, and the rear panel 148, the storage area 26 can be increased without the requirement of removing the truck bed cover 650.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck bed height extension assembly comprising:
    a truck bed that includes a floor and a pair of spaced apart sidewalls, each of the pair of sidewalls includes an exterior wall, an opposite interior wall, and an elongated cavity positioned between the exterior wall and the interior wall of each of the pair of sidewalls; and
    a pair of side panels that are linearly displaceable in a vehicle vertical direction between a retracted position and an extended position, in the retracted position each of the pair of side panels are positioned within the elongated cavity defined in each of the pair of sidewalls, and in the extended position each of the pair of side panels are positioned to extended at least partially outside of the elongated cavity of each of the pair of sidewalls.

2. The truck bed height extension assembly of claim 1, wherein the exterior wall of each of the pair of sidewalls includes an inner surface and an opposite outer surface, and wherein the interior wall of each of the pair of sidewalls includes an inner surface and an opposite outer surface, and wherein the elongated cavity of each of the pair of sidewalls is defined between the inner surface of the exterior wall and the inner surface of the interior wall of each of the pair of sidewalls, and
    wherein each of the pair of sidewalls includes an upper end that extends between the exterior wall and the interior wall of each of the pair of sidewalls, the upper end of each of the pair of sidewalls includes an elongated opening that connects to the elongated cavity of each of the pair of sidewalls.

3. The truck bed height extension assembly of claim 2, wherein each of the pair of sidewalls includes a distal end and an opposite proximate end, in the retracted position the distal end of each of the pair of side panels is positioned below the upper end in the vehicle vertical direction.

4. The truck bed height extension assembly of claim 3, wherein in the extended position the distal end of each of the pair of side panels is positioned above the upper end of each of the pair of sidewalls in the vehicle vertical direction and the proximate end of each of the pair of side panels is positioned below the upper end of each of the pair of sidewalls in the vehicle vertical direction.

5. The truck bed height extension assembly of claim 1 further comprising an actuator connected to each of the pair of side panels, the actuator is actuated to move each of the pair of side panels between the retracted position and the extended position.

6. The truck bed height extension assembly of claim 1, wherein the truck bed includes a rear wall and a rear panel, the rear wall extends between rear ends of each of the pair of sidewalls, and the rear wall includes an exterior wall and an interior wall, and an elongated cavity positioned between the exterior wall and the interior wall of the rear wall;
    wherein the rear panel is linearly displaceable in the vehicle vertical direction between a retracted position and an extended position, in the retracted position the rear panel is positioned within the elongated cavity defined in the rear wall, and in the extended position the rear panel is positioned to extended at least partially outside of the elongated cavity of the rear wall.

7. The truck bed height extension assembly of claim 6, wherein the truck bed includes a front wall and a front panel, the front wall extends between front ends of each of the pair of sidewalls, and the front wall includes an exterior wall and an interior wall, and an elongated cavity positioned between the exterior wall and the interior wall of the front wall;
    wherein the front panel is linearly displaceable in the vehicle vertical direction between a retracted position and an extended position, in the retracted position the front panel is positioned within the elongated cavity defined in front wall, and in the extended position the front panel is positioned to extended at least partially outside of the elongated cavity of the front wall.

8. The truck bed height extension assembly of claim 7 further comprising a truck bed cover that is releasably connected to the pair of side panels, the front panel, and the rear panel, the truck bed cover is moveable between a lowered position and a raised position, the truck bed cover is in the lowered position when the pair of side panels, the rear panel, and the front panel are in the retracted position, and the truck bed cover is in the raised position when the pair of side panels, the rear panel, and the front panel are in the extended position.

9. A pickup truck comprising:
    a passenger cabin;
    a truck bed positioned rearward of the passenger cabin in a vehicle longitudinal direction, the truck bed includes a floor and a pair of spaced apart sidewalls, each of the pair of spaced apart sidewalls includes an exterior wall, an opposite interior wall, and an elongated cavity positioned between the exterior wall and the interior wall of each of the pair of sidewalls; and
    a pair of side panels that are linearly displaceable in a vehicle vertical direction between a retracted position and an extended position, in the retracted position each of the pair of side panels are positioned within the elongated cavity defined in each of the pair of sidewalls, and in the extended position each of the pair of side panels are positioned to extended at least partially outside of the elongated cavity of each of the pair of sidewalls.

10. The pickup truck of claim 9, wherein the exterior wall of each of the pair of sidewalls includes an inner surface and an opposite outer surface, and wherein the interior wall of each of the pair of sidewalls includes an inner surface and an opposite outer surface, and wherein the elongated cavity of each of the pair of sidewalls is defined between the inner surface of the exterior wall and the inner surface of the interior wall of each of the pair of sidewalls, and
    wherein each of the pair of sidewalls includes an upper end that extends between the exterior wall and the interior wall of each of the pair of sidewalls, the upper end of each of the pair of sidewalls includes an elongated opening that connects to the elongated cavity of each of the pair of sidewalls.

11. The pickup truck of claim 10, wherein each of the pair of sidewalls includes a distal end and an opposite proximate end, in the retracted position the distal end of each of the pair of side panels is positioned below the upper end in the vehicle vertical direction.

12. The pickup truck of claim 11, wherein in the extended position the distal end of each of the pair of side panels is positioned above the upper end of each of the pair of sidewalls in the vehicle vertical direction and the proximate end of each of the pair of side panels is positioned below the upper end of each of the pair of sidewalls in the vehicle vertical direction.

13. The pickup truck of claim 9 further comprising an actuator connected to each of the pair of side panels, the actuator is actuated to move each of the pair of side panels between the retracted position and the extended position.

14. The pickup truck of claim 9, wherein the truck bed includes a rear wall and a rear panel, the rear wall extends between rear ends of each of the pair of sidewalls, and the rear wall includes an exterior wall and an interior wall, and an elongated cavity positioned between the exterior wall and the interior wall of the rear wall;

wherein the rear panel is linearly displaceable in the vehicle vertical direction between a retracted position and an extended position, in the retracted position the rear panel is positioned within the elongated cavity defined in the rear wall, and in the extended position the rear panel is positioned to extended at least partially outside of the elongated cavity of the rear wall.

15. The pickup truck of claim 14, wherein the truck bed includes a front wall and a front panel, the front wall extends between front ends of each of the pair of sidewalls, and the front wall includes an exterior wall and an interior wall, and an elongated cavity positioned between the exterior wall and the interior wall of the front wall;

wherein the front panel is linearly displaceable in the vehicle vertical direction between a retracted position and an extended position, in the retracted position the front panel is positioned within the elongated cavity defined in front wall, and in the extended position the front panel is positioned to extended at least partially outside of the elongated cavity of the front wall.

16. The pickup truck of claim 15 further comprising a truck bed cover that is releasably connected to the pair of side panels, the front panel, and the rear panel, the truck bed cover is moveable between a lowered position and a raised position, the truck bed cover is in the lowered position when the pair of side panels, the rear panel, and the front panel are in the retracted position, and the truck bed cover is in the raised position when the pair of side panels, the rear panel, and the front panel are in the extended position.

17. A truck bed height extension assembly comprising:
a truck bed that includes a floor and a pair of spaced apart sidewalls, each of the pair of spaced apart sidewalls includes an exterior wall and an opposite interior wall, the interior wall of each of the pair of sidewalls includes an inner surface and a recessed portion, the recessed portion includes a shoulder portion and a recessed surface; and
a pair of side panels that are linearly displaceable in a vehicle vertical direction between a retracted position and an extended position, each of the pair of side panels includes a distal end and an opposite proximate end, in the retracted position the proximate end of each of the pair of side panels abuts the shoulder portion of the recessed portion, and in the extended position the proximate end of each of the pair of side panels is spaced apart from the shoulder portion of the recessed portion.

18. The truck bed height extension assembly of claim 17, wherein each of the pair of side panels includes an outer surface and an opposite inner surface, the inner surface of each of the pair of side panels faces the recessed surface of each of the pair of sidewalls.

19. The truck bed height extension assembly of claim 18, wherein a distance between the inner surface of each of the pair of sidewalls is less than a distance between the recessed surface of the recessed portion of each of the pair of sidewalls.

20. The truck bed height extension assembly of claim 17 further comprising an actuator connected to each of the pair of side panels, the actuator is actuated to move each of the pair of side panels between the retracted position and the extended position.

* * * * *

UNITED STATES PATENT AND TRADEMARK OFFICE
CERTIFICATE OF CORRECTION

PATENT NO. : 10,494,037 B2  
APPLICATION NO. : 15/865932  
DATED : December 3, 2019  
INVENTOR(S) : Clinton J. Williams Page 1 of 1

It is certified that error appears in the above-identified patent and that said Letters Patent is hereby corrected as shown below:

On the Title Page

Column 1, item (73), assignee, delete "Engineerig" and insert --Engineering--, therefor.

Signed and Sealed this  
Eleventh Day of February, 2020

Andrei Iancu  
*Director of the United States Patent and Trademark Office*